(12) United States Patent
Sommer

(10) Patent No.: US 12,493,882 B2
(45) Date of Patent: Dec. 9, 2025

(54) COMPUTER-VISION BASED DETECTION OF SCAMS AT PHYSICAL POINT OF SALE TERMINALS

(71) Applicant: TARGET BRANDS, INC., Minneapolis, MN (US)

(72) Inventor: Ethan Sommer, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 335 days.

(21) Appl. No.: 18/303,634

(22) Filed: Apr. 20, 2023

(65) Prior Publication Data
US 2024/0029069 A1 Jan. 25, 2024

Related U.S. Application Data

(60) Provisional application No. 63/390,727, filed on Jul. 20, 2022.

(51) Int. Cl.
G06Q 20/00 (2012.01)
G06Q 20/20 (2012.01)
G06Q 20/40 (2012.01)
G06V 10/70 (2022.01)
G06V 20/52 (2022.01)
G06V 40/20 (2022.01)
G07G 1/12 (2006.01)

(52) U.S. Cl.
CPC ....... G06Q 20/4016 (2013.01); G06Q 20/204 (2013.01); G06V 10/70 (2022.01); G06V 20/52 (2022.01); G06V 40/20 (2022.01); G07G 1/12 (2013.01)

(58) Field of Classification Search
CPC ............ G06Q 20/4016; G06Q 20/204; G06Q 20/206; G06V 10/70; G07G 3/006; G07G 1/12
See application file for complete search history.

(56) References Cited

U.S. PATENT DOCUMENTS

| 8,104,680 | B2 | 1/2012 | Kundu et al. |
| 9,734,673 | B2 | 8/2017 | Priesterjahn et al. |
| 9,881,216 | B2 | 1/2018 | Buehler |
| 10,769,986 | B2 | 9/2020 | Zuo |

(Continued)

FOREIGN PATENT DOCUMENTS

GB 2497368 A 6/2013

Primary Examiner — Rokib Masud
(74) Attorney, Agent, or Firm — Barnes & Thornburg LLP

(57) ABSTRACT

The disclosed technology provides for detecting a scam attempt in a physical retail environment. A system can include a camera that captures image data of a checkout area, a cash register that generates event data during a checkout process, and an edge computing device that accesses scam detection criteria identifying combinations of visual and event features corresponding to checkout scams, receive the image data, receive the event data, which includes (i) an indication that the checkout process is a cash transaction and/or (ii) a cash register drawer open event, detect, based on processing the image data, physical movement of a form of payment in or around the checkout area, correlate timestamps for the physical movement with the event data, generate an indication of the checkout scams based on satisfying the scam detection criteria, and return the indication of the checkout scams being performed.

20 Claims, 11 Drawing Sheets

(56) References Cited

U.S. PATENT DOCUMENTS

| | | |
|---|---|---|
| 2009/0201372 A1 | 8/2009 | O'Doherty et al. |
| 2020/0279310 A1* | 9/2020 | Kundu ................. G07G 1/0036 |
| 2021/0216785 A1* | 7/2021 | Debucean ............. G06F 18/214 |

* cited by examiner

COMPUTER-VISION BASED DETECTION OF SCAMS AT PHYSICAL POINT OF SALE TERMINALS

INCORPORATION BY REFERENCE

This application claims priority to U.S. Provisional Application Ser. No. 63/390,727, filed on Jul. 20, 2022, the disclosure of which is incorporated by reference in its entirety.

TECHNICAL FIELD

This document generally describes devices, systems, and methods related to generating automatic system-based determinations scams are occurring in a physical environment, such as a retail store, based on correlating disparate data sources, such as digital image data captured by a camera near a point of sale terminal.

BACKGROUND

A retail environment, such as a store, sells a variety of items. Guests can shop for items in the retail environment before going to a checkout lane to purchase their items. The retail environment can have manual checkout lanes. A manual checkout lane can be manned by an employee of the retail environment, such as a cashier. The cashier can scan the items to be purchased and ask the guest for a form of payment in order to complete a transaction and the checkout process. The guest can pay with different forms of payment, such as cash money, credit cards, debit cards, gift cards, or other forms of payment. The guest can also pay using mobile payment information, such as an e-wallet that is loaded on the guest's mobile device (e.g., smartphone).

Sometimes, a guest can attempt to complete a checkout process without paying for items. For example, the guest can provide fake cards or cash cards to the cashier to make it appear as if the guest is actually paying for the items. Duping the cashier to run a fake cash card as cash payment is called a K1 scam, or non-payment cash scam. In a K1 scam, the guest can provide the cashier with a card, such as a credit card, gift card, debit card, cash card, or prepaid card that looks like an actual card but is in fact fake. When the guest tries to swipe the card at a point of sale (POS) terminal during checkout, the card does not work. As a result, the guest may give the card to the cashier and describe that it is a "cash only" card. The cashier can then follow instructions on the back of the card indicating how to use the card, which causes the drawer of the cash register to open. The cash register consequently processes the guest's transaction as a cash transaction and the cashier may be led to believe the card works. The transaction is completed without the guest actually paying for the item(s). The guest receives a receipt and leaves the retail environment without paying. Sometimes, the guest may take the item(s) to another retail environment and return the item(s) for cash.

SUMMARY

The document generally describes techniques and methods deployable with edge computing technology for quickly and efficiently detecting scams in physical environments, such as at POS in retail stores. The disclosed technology includes techniques for more accurately and efficiently detecting scams that are attempted at or around a POS terminal, such as K1 scams. The determinations can be automatically made in real-time, such as through the use of edge computing devices that leverage low computational resources (e.g., low powered processors, small amount of RAM), which can permit for the scam attempts to be blocked, prevented, or otherwise stopped before they have been completed. For example, the edge computing devices can apply machine learning models to digital image data of a checkout lane to automatically detect payment during a checkout process at the checkout lane, then correlate characteristics of the detected payment with checkout event data from devices and/or systems used during the checkout process (e.g., a cash register, a POS terminal) to determine whether one or more scams, such as a K1 scam, is being attempted during the checkout process. These techniques can provide accurate, quick, and reliable scam detection (e.g., K1 scams) while using minimal computational resources, which can permit for real-time or near real-time determinations and subsequent interventions during or immediately after the scam attempt has occurred.

The disclosed technology can be used to detect any of a variety of scams at a POS terminal or other checkout lane where cash may exchange hands, such as K1 scams, which are non-payment cash scams in which a guest presents a fake card as payment during a checkout process. In the K1 scam example, the card does not work when swiped at a POS terminal, so the guest may give the card to a cashier during the checkout process, who then follows instructions to run the card as if it has cash tied to it. When the cashier runs the card, a drawer of the cash register opens, signaling that the transaction has been completed as a cash payment (even though no money is actually being deducted from the card). A receipt is printed and the guest leaves the retail environment without actually paying for the item(s). The guest may bring the item(s) and receipt to another retail environment and return the item(s) to receive cash. The disclosed technology can be used to automatically detect such types of scams in real-time and/or near real-time so that a guest engaging in a scam, such as K1 scams, can be stopped, apprehended, and/or deterred from performing such activity.

More particularly, the disclosed technology performs scam detection by correlating seemingly disparate data sources from devices and systems in a retail environment to determine whether a guest is attempting one or more scams (e.g., a K1 scam). For example, cameras positioned near and/or around a checkout area can capture image data of checkout lanes in the checkout area. The image data can be received by an edge computing device and analyzed using machine learning techniques to detect absence of movement (or movement) of money, such as cash, during checkout processes at the checkout lanes. The edge computing device can correlate the processed image data with checkout data received from devices and systems used during the checkout processes, such as cash registers and POS terminals. The checkout data can, for example, indicate whether a cash register drawer opened during a checkout process. The checkout data can also indicate whether the transaction is registered as a cash transaction. The edge computing device can determine whether the absence of cash movement in the image data corresponds to events in the checkout data. If such an association is made, the edge computing device may determine that a guest is attempting a K1 scam, or another scam that is being monitored for and detected. The edge computing device can generate an indication, notification, message, or other type of alert that can be transmitted to relevant stakeholders, such as the cashier, safety and security personnel, other in-store employees, and/or law enforcement. Based on the alert, the relevant stakeholders can take appropriate action to stop the K1 scam, apprehend the guest, and/or prevent the guest, or others (e.g., accomplices) from performing similar activities at a current time and/or in the future.

One or more embodiments described herein can include a system for detecting a scam attempt in a physical retail environment, the system can include: at least one camera positioned within a physical retail environment, the at least one camera being able to capture image data of a checkout area in the physical retail environment, a cash register having a cash register drawer, the cash register generating event data during a checkout process, and an edge computing device in communication with the at least one camera and the cash register. The edge computing device can access, from a data storage device, scam detection criteria that identifies combinations of visual features and event features that correspond to one or more checkout scams, receive, from the at least one camera, the image data of the checkout area, receive, from the cash register, the event data, the event data being associated with the checkout process in the checkout area, the event data including at least one of (i) an indication that the checkout process is a cash transaction and (ii) a cash register drawer open event, detect, based on processing of the image data, physical movement of a form of payment in or around the checkout area, correlate timestamps for the detected physical movement of the form of payment with the event data, generate an indication of the one or more checkout scams based on the event data, the physical movement of the form of payment, and the correlated timestamps satisfying the scam detection criteria, and return the indication of the one or more checkout scams being performed at the cash register and in the checkout area.

In some implementations, the embodiments described herein can optionally include one or more of the following features. For example, the edge computing device can: identify, based on applying a machine learning trained model to the image data, a type of payment in the image data, the type being cash or a card, and correlate the detected physical movement with the event data to identify the one or more checkout scams based on identifying the type of payment as a card. The edge computing device can also identify the type of payment in the image data as cash, and based on determining that the type of payment is cash, return to the receiving, from the at least one camera, the image data of the checkout area. The edge computing device can also perform the detecting step based on determining that the type of payment is a card.

As another example, the edge computing device can also assign a confidence value indicating a likelihood of the one or more checkout scams to the identified one or more checkout scams based on the correlating step. The edge computing device can assign the confidence value above a threshold confidence value based on the cash register drawer open event having the timestamp within the threshold amount of time after the timestamp of the detected physical movement. The edge computing device can also determine that the event data may not include the cash register drawer open event, and assign the confidence value below a threshold confidence value based on an absence of the cash register drawer open event in the event data. The identified one or more checkout scams can also satisfy the scam detection criteria based on the confidence value exceeding a threshold scam detection confidence level.

As another example, detecting the physical movement can include: identifying, using object detection techniques, a portion of the image data having the cash register that generated the event data during the checkout process, extracting the portion of the image data, and detecting the movement of the form of payment in the extracted portion of the image data. Sometimes, detecting the physical movement can include: identifying a direction of the detected physical movement, and generating a confidence value that the direction of the detected physical movement corresponds to the one or more checkout scams, the direction of the detected physical movement being from a guest to a cashier in the checkout area. Moreover, the edge computing device can detect the physical movement based on applying a model to the image data, the model having been trained with machine learning techniques to detect the physical movement of the form of payment in the image data and classify the detected physical movement. The model could have been trained to identify the form of payment from a background in the image data and classify the detected form of payment, the form of payment being classified as cash or card.

In some implementations, the edge computing device can also: detect the cash register drawer opening in the image data based on applying a model to the image data, determine whether the detecting of the cash register drawer opening has a timestamp within the threshold amount of time after the timestamp of the detected physical movement, and identify the one or more checkout scams based on the timestamp of the cash register drawer opening being within the threshold amount of time after the timestamp of the detected physical movement. The edge computing device can also assign a confidence value to the identified one or more checkout scams above a threshold confidence value based on the identifying step. The edge computing device may also increase the assigned confidence value based on determining that the event data includes at least one of (i) the indication that the checkout process is a cash transaction and (ii) the cash register drawer open event. The edge computing device can also identify a type of payment in the image data, the type being cash or a card, and identify the one or more checkout scams based on (i) the timestamp of the cash register drawer opening being within the threshold amount of time after the timestamp of the detected physical movement and (ii) the identified type of payment being a card.

As another example, returning the indication of the one or more checkout scams can include transmitting the indication to a computing device of a relevant stakeholder for presentation in a graphical user interface (GUI) display at the computing device, the relevant stakeholder being at least one of a cashier, an in-store employee, a safety and security personnel, and law enforcement. Returning the indication of the one or more checkout scams further can include transmitting a portion of the image data to the computing device of the relevant stakeholder, the portion of the image data depicting a guest in the checkout area during the checkout process. Returning the indication of the one or more checkout scams further can include transmitting transaction data correlated with the checkout process to the computing device of the relevant stakeholder. Returning the indication of the one or more checkout scams can also include transmitting instructions to the cash register that, when executed, cause the cash register to temporarily stop the checkout process. Returning the indication of the one or more checkout scams can include transmitting instructions to the cash register that, when executed, prompt a guest in the checkout area to provide an alternative form of payment during the checkout process. Executing the instructions, at the cash register, can include displaying the prompt on a GUI display of a point of sale (POS) terminal in the checkout area.

Sometimes, the image data can be received in real-time. The event data can be received in real-time. The image data can be received in near real-time. The event data can be received in near real-time. The edge computing device can be part of the at least one camera. The edge computing device can be separate from the camera. The at least one camera can include a physical housing and the edge computing device can be positioned in the physical housing. The edge computing device can be firmware or software installed on the at least one camera. The edge computing device can be a remote computing system. The at least one camera can be positioned at a checkout lane in the checkout area, the at least one camera having a field of view (FOV) that can include the cash register and at least a portion of a conveyor belt at the checkout lane. The at least one camera can have a FOV that includes multiple checkout lanes in the checkout area. The one or more checkout scams can include a K1 scam.

One or more embodiments described herein can include a method for detecting a scam attempt in a physical retail environment, the method including: accessing, by a computing device and from a data storage device, scam detection criteria that identifies combinations of visual features and event features that correspond to one or more checkout scams, receiving, by the computing device and from at least one camera, image data of a checkout area in a physical retail environment, receiving, by the computing device and from a cash register, event data, the event data including at least one of (i) an indication that a checkout process is a cash transaction and (ii) a cash register drawer open event, detecting, by the computing device and based on processing of the image data, physical movement of a form of payment in or around the checkout area, correlating, by the computing device, timestamps for the detected physical movement of the form of payment with the event data, generating, by the computing device, an indication of the one or more checkout scams based on the event data, the physical movement of the form of payment, and the correlated timestamps satisfying the scam detection criteria, and returning, by the computing device, the indication of the one or more checkout scams being performed at the cash register and in the checkout area.

The method can optionally include one or more of the abovementioned features and one or more of the following features. As another example, the computing device can be an edge computing device. The at least one camera can be positioned within the physical retail environment, the at least one camera being configured to capture the image data of the checkout area in the physical retail environment. The event data can be generated by the cash register during the checkout process, the event data being associated with the checkout process in the checkout area. The cash register can also have a cash register drawer.

The devices, system, and techniques described herein may provide one or more of the following advantages. For example, the disclosed technology provides for more quickly, efficiently, and accurately aggregating and analyzing a combination of disparate data sources to identify scams, such as K1 scams, in real-time and/or near real-time. Existing technology, such as cameras and POS terminals, in the retail environment can be leveraged to collect real-time data about checkout processes. The data can be analyzed and correlated by edge computing devices in the retail environment to make informed and accurate system-based inferences about whether suspicious activity is occurring during a checkout process, without requiring the retail environment to be retrofitted with specific or new technology. As a result, the disclosed technology can be quickly and seamlessly integrated into any retail environment.

Similarly, the disclosed technology can be performed on the edge, thereby efficiently using compute resources, processing power, and network bandwidth to quickly and accurately detect scams at POS terminals or other checkout lanes. Since the disclosed technology is performed on the edge, actions can be taken in real-time and/or near real-time to prevent and/or deter identified scams, such as K1 scams. The disclosed technology can be deployed on the edge as firmware or software installed on an existing camera, POS terminal, or other device or system in the retail environment. The disclosed technology can also be deployed on the edge on an edge computing device in the retail environment. Since the disclosed technology is lightweight, the disclosed technology can be deployed in any existing infrastructure of any retail environment, thereby providing the retail environment with real-time and/or near real-time detection and prevention of scams at POS terminals and other checkout lanes.

The disclosed technology may also enhance and increase checkout procedures used for responding to security events in the retail environment. Since the disclosed technology is computationally efficient and lightweight, real-time risk assessments can be performed on the edge to determine whether scams at POS terminals or other checkout lanes are occurring. Depending on the real-time risk associated with a detected scam, various checkout procedure responses can be generated and performed in real-time or near real-time to prevent or otherwise deter the scam. Overall security in the retail environment may improve in response to these improved checkout procedures.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

This document generally relates to technology for automatically detecting a scam at a POS terminal or other checkout lane during a checkout process in a physical environment, such as a retail store, based on processing digital image data of the checkout lane and correlating the processed image data with checkout event data from devices and/or systems used during the checkout process. The disclosed techniques leverage edge computing technology and data from existing devices and systems in the retail environment, such as cameras positioned near checkout lanes and cash registers and/or POS terminals at the checkout lane, to quickly, efficiently, and reliably identify whether a guest is attempting to scam a cashier during a checkout process in real-time and/or near real-time.

The disclosed technology can be used to identify and deter various types of scams during the checkout process. Once such type of scam is a K1 scam. In a K1 scam, a guest can provide a cashier with an improper form of payment for items to be purchased, such as a fake credit card, debit card, cash card, prepaid card, and/or gift card(s). When the improper form of payment is processed by the casher, a cash register at the checkout lane can register the transaction as a cash transaction, even though the form of payment is not linked to any money. When the cash register identifies the transaction as a cash transaction, a drawer of the cash register automatically opens, but the guest neither provides cash money to the cashier nor does the cashier provide cash money to the guest. The guest is able to walk out of the retail environment with the items and a receipt without actually paying for the items. Then, the guest can go to other retail environments and return the items in exchange for cash. The disclosed technology can be used to identify this type of scam in real-time or near real-time so that preventative action can be taken to stop the K1 scam from occurring. Although the disclosed technology can be used to identify and respond to different types of scams, the present disclosure is described from the perspective of detecting and responding to K1 scams. The K1 scams are merely illustrative examples.

Figure 1A:
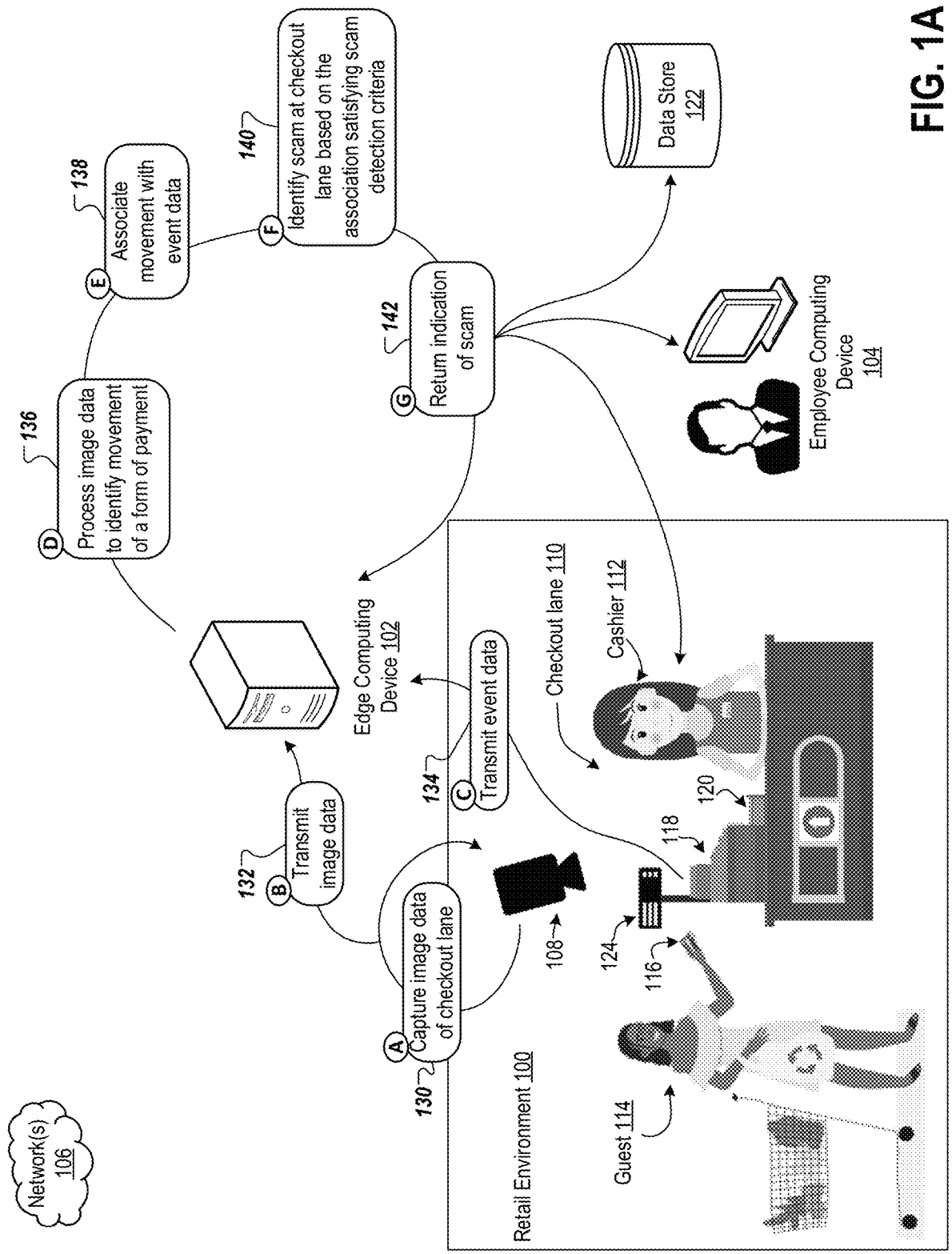
FIG. 1A is a conceptual diagram for detecting a scam during a checkout process in a retail environment.

Referring to the figures, FIG. 1A is a conceptual diagram for detecting a scam during a checkout process in a retail environment 100, such as a K1 scam. The retail environment 100 can include a checkout lane 110 where a cashier 112 can scan items purchased by a guest 114 during a checkout process. The retail environment 100 can include multiple checkout lanes, as described further in reference to FIG. 2. In FIG. 1A, only one checkout lane 110 is depicted for illustrative purposes. The checkout lane 110 can include a variety of systems and/or devices. The checkout lane 110 can include a cash register 118 having a drawer 120. The drawer 120 can be configured to hold cash money and/or change. The drawer 120 may be triggered, by an event from the cash register 118m indicating that a cash transaction is being performed during the checkout process. The checkout lane 110 can also include a POS terminal 124 configured to receive a form of payment or other payment information from the guest 114. The checkout lane 110 can include additional or alternative components, including but not limited to cameras, scanning devices, scales, display screens, touch screens, flatbed scanners, etc.

Figure 2:
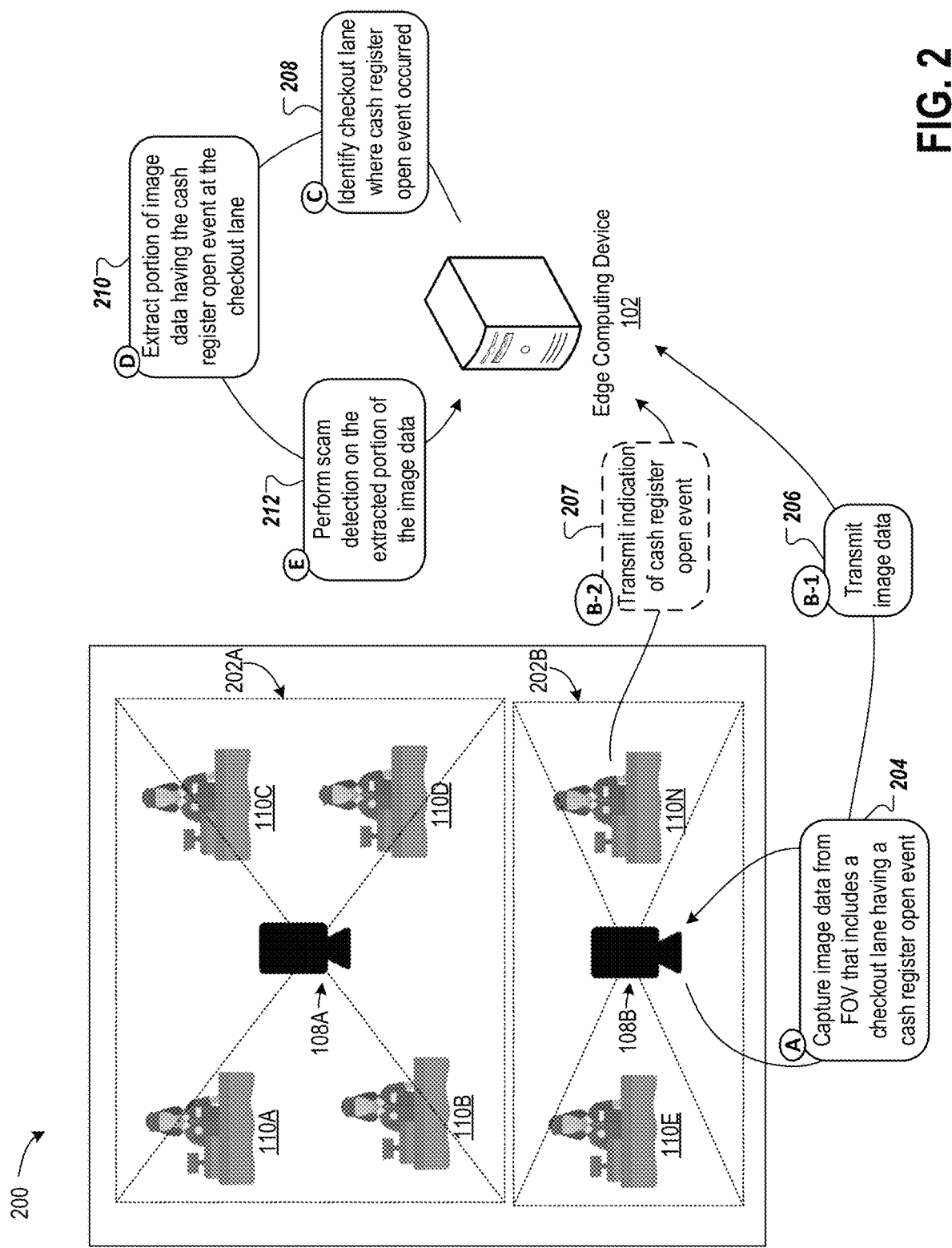
FIG. 2 is a conceptual diagram of a checkout area having multiple overhead cameras.

The retail environment 100 can also include a camera 108 near the checkout lane 110. The retail environment 100 can include multiple cameras at, near, and/or around the checkout lane 110 and/or other checkout lanes. The camera 108 can also be an overhead camera trained on more than one checkout lane. The camera 108 can be any type of camera used in the retail environment 100, including but not limited to a CCTV camera, security camera, surveillance camera, low resolution camera, high resolution camera, etc. In some implementations, the camera 108 can be part of one or more devices and/or systems of the checkout lane 110. For example, the camera 108 can be integrated into a POS terminal 124, a cash register 118, or any other device or system at the checkout lane 110. As another example, the camera 108 can be attached to a pole or other fixture near or at the checkout lane 110 and trained on at least the checkout lane 110. Refer to FIG. 2 for further discussion about configuration of checkout lanes and cameras in a checkout area of the retail environment 100.

In the example of FIG. 1A, the camera 108 can be an overhead camera trained on the checkout lane 110. The camera 108 can be configured to capture digital image data (e.g., still images, video feed) of activity and events occurring at the checkout lane 110. For example, the camera 108 can capture a continuous stream of digital image data (e.g., a video feed) of the area around the checkout lane 110 during a checkout process. The image data may depict loading of items to be purchased onto a flatbed and/or conveyor belt, scanning and bagging the items, providing a form of payment to complete the checkout process, and completing the checkout process.

An edge computing device 102 can communicate (e.g., wired and/or wireless) with one or more devices and/or systems in the retail environment 100, an employee computing device 104, and/or a data store 122 via network(s) 106. For example, the edge computing device 102 can communicate with the camera 108, the cash register 118, and/or the POS terminal 124. In some implementations, the edge computing device 102 can be firmware or software installed on one or more existing devices and/or systems in the retail environment. For example, the edge computing device 102 can be installed on the POS terminal 124 and/or the cash register 118. As another example, the edge computing device 102 can be installed on the camera 108. In some implementations, the edge computing device 102 can be physically included in a housing of one or more devices and/or systems, including but not limited to the camera 108, the cash register 118, and/or the POS terminal 124. Performing the disclosed techniques at the edge computing device 102 can provide for quick, reliable, and efficient detection of scams, such as K1 scams, in real-time and/or near real-time by leveraging less computational resources, processing power, and/or network bandwidth in contrast to other techniques and/or computing systems.

Still referring to FIG. 1A, the camera 108 can capture image data of the checkout lane 110 (block A, 130). As described above, the image data can be a continuous stream of digital image data, such as a video feed. The camera 108's field of view (FOV) can be configured to capture image data of the guest 114, the cashier 112, the POS terminal 124, and/or the cash register 118 throughout a checkout process at the checkout lane.

The camera 108 can transmit the image data to the edge computing device 102 (block B, 132). In some implementations, if the edge computing device 102 is part of the camera 108, block B (132) may not be performed. The image data can be transmitted in real-time, as it is captured by the camera 108. The image data can also be transmitted in near real-time, at predetermined time intervals, and/or in batch processes.

One or more devices and/or systems at the checkout lane 110 can also transmit checkout event data to the edge computing device 102 (block C, 134). Block C (134) can be performed before, during, and/or after one or more blocks, such as blocks A and/or B (130 and 132, respectively). The POS terminal 124 can transmit transaction data to the edge computing device 102 during the checkout process, the transaction data including information about quantity and price of items to be purchased, discounts or other offers applied to the guest 114's transaction, the guest 114's login account information, and/or payment information. As another example, the cash register 118 can transmit checkout event data to the edge computing device 102, such as an indication of whether the drawer 120 of the cash register 118 opened during the checkout process. Thus, the cash register 118 can transmit cash register drawer open event information to the edge computing device 102.

In block D (136), the edge computing device 102 can process the image data to identify movement of a form of payment during the checkout process at the checkout lane 110. Sometimes, block D (136) can be performed before block C (134). As described herein, the edge computing device 102 can apply one or more machine learning trained models to the image data. Using the at least one model, the edge computing device 102 can detect and identify the absence of movement of a cash payment and/or the presence of movement of a cash payment. The edge computing device 102 can also detect and identify a type of payment provided by the guest 114, such as a card 116. Additionally or alternatively, the edge computing device 102 can detect and identify if and when the drawer 120 of the cash register 118 opens. The edge computing device 102 can also perform Block D (136) using one or more other image analysis and/or object detection techniques.

As described herein, detection of movement of cash from the guest 114 to the cashier 112 can indicate that the guest 114 is providing a proper form of payment to complete the checkout process. However, the absence of cash movement from the guest 114 to the cashier 112 can indicate suspicious activity, especially when correlated with event data received in block C (134).

Accordingly, in block E (138), the edge computing device 102 can associate the movement identified in the image data with the received event data. The event data can include a cash register open event, which can indicate that the drawer 120 of the cash register 118 opened in response to the guest 114 providing payment in the form of the card 116. The card 116 can be a fake card that is not tied to any money or cash. For example, the card 116 can be a fake credit card, debit card, cash card, prepaid card, and/or gift card. The event data can additionally or alternatively include transaction data indicating that a cash transaction was completed and/or a type of payment that was used to complete the checkout process. The edge computing device 102 can associate the absence of cash movement in the image data with a cash register open event to identify a potential K1 scam. The edge computing device 102 can additionally or alternatively associate presence of the card 116 in the image data with the cash register open event and/or the cash transaction data to identify a potential K1 scam. Similarly, the edge computing device 102 can associate the presence of cash movement in the image data with the event data to confirm that the guest 114 provided a proper form of payment and therefore is not engaging in a scam, such as a K1 scam.

In block E (138), the edge computing device 102 can also generate a confidence value for the association. The confidence value can indicate a likelihood that the guest 114 is engaging in a scam (e.g., K1 scam). The higher the confidence value, for example, the higher the likelihood of a K1 scam while the lower the confidence value, the lower the likelihood of a K1 scam. For example, if cash movement is detected in the image data and the event data indicates a cash transaction was completed, the edge computing device 102 can generate a confidence value below a threshold confidence level, thereby indicating that the guest 114 likely is not engaging in a K1 scam. On the other hand, if cash movement is not detected in the image data and the event data indicates that a cash transaction was completed, the edge computing device 102 can generate a confidence value above the threshold confidence level, thereby indicating that the guest 114 likely is engaging in a K1 scam. The assigned confidence value can be used by the edge computing device 102 to determine whether a response should be taken to stop the K1 scam in real-time and/or near real-time.

The edge computing device 102 can identify a scam at the checkout lane 110 based on the association made in block E (138) satisfying scam detection criteria (block F, 140). The scam detection criteria can indicate a threshold confidence value that must be satisfied in order to identify a K1 scam. The scam detection criteria can also indicate one or more other rules and/or conditions that must be satisfied in order to identify the K1 scam.

In block G (142), the edge computing device 102 can return the indication of the scam. The indication can include information such as a timestamp indicating when the scam was detected, an identifier for the checkout lane 110 where the scam was detected, guest information such as an objective identifier, payment information, and/or user account information, and/or cashier information such as an employee number or other unique identifier. The indication can also include at least a portion of the image data that was processed in block D (136). For example, the indication can include at least one image of the image data that depicts the guest 114. This image can then be used by a relevant stakeholder of the retail environment 100 to objectively identify, monitor, and/or apprehend the guest 114 before they leave the retail environment 100. The indication can also include other information that may be useful for responding to the particular type of scam that has been identified.

The edge computing device 102 can, for example, transmit the indication to a device or system at the checkout lane 110, such as the cash register 118 and/or the POS terminal 124. The edge computing device 102 can also transmit the indication to a user computing device of the cashier 112, such as a mobile phone, smartphone, tablet, or other computing device used by the cashier 112 while working in the retail environment. The indication can be received at the device and/or system at the checkout lane 110 so that the cashier 112 may take appropriate action during the checkout process before the guest 114 leaves the retail environment 100. For example, the cashier 112 can receive the indication with an alert or other type of message prompting the cashier 112 to ask the guest 114 for another form of payment. The indication can also include a message prompting the cashier 112 to stop the current checkout process.

The edge computing device 102 can additionally or alternatively transmit the indication to the employee computing device 104. The employee edge computing device 104 can be used by a relevant stakeholder of the retail environment 100, such as an in-store employee, safety and security personnel, and/or law enforcement. The employee computing device 104 can be any type of user device, including but not limited to a mobile phone, smart phone, wearable device, laptop, tablet, or other computing system. The relevant stakeholder can view the indication at the device 104 and decide one or more actions to be taken in response to the scam detection. For example, the relevant stakeholder may decide to monitor the guest 114 during the current checkout process and/or during future shopping trips in the retail environment 100. The relevant stakeholder can notify other stakeholders at other retail environments that the guest 114 performed a K1 scam and may attempt to return the items scanned during the checkout process to any of those retail environments. Therefore, the other retail environments can be aware and on the lookout for the guest 114 attempting to get cash back for the items. The relevant stakeholder can also notify law enforcement or other safety and security personnel of the K1 scam. The relevant stakeholder can add the guest 114 to a watch list for the retail environment 100 and/or a network of retail environments based on reviewing the indication. As another example, the relevant stakeholder can decide to stop and/or apprehend the guest 114 before they leave the retail environment 100 to prevent the K1 scam from being completed. The relevant stakeholder can determine one or more other actions in response to receiving the indication of the scam in block G (142). In some implementations, the edge computing device 102 can generate and recommend one or more actions (such as the actions described above) that can be taken by the relevant stakeholder in response to and based on the type of scam that was detected (e.g., the higher confidence that the scam occurred/is occurring, the more serious the recommended response).

The edge computing device 102 can additionally or alternatively store the indication of the scam in the data store 122. The data store 122 can be any type of data storing device and/or system, including but not limited to a database, local memory, network of devices, cloud-based storage, etc. The indication can then be retrieved at a later time from the data store 122 and by the edge computing device 102, the employee computing device 104, and/or another user device of a relevant stakeholder of the retail environment 100. The indication can then be used to determine one or more near real-time actions that can be taken in response to the identified scam (e.g., monitoring the associated guest 114 during future trips to the retail environment 100 or other retail environments within a network, associating the guest 114 with other guests involved in scams and/or organized crime(s)).

Figure 1B:
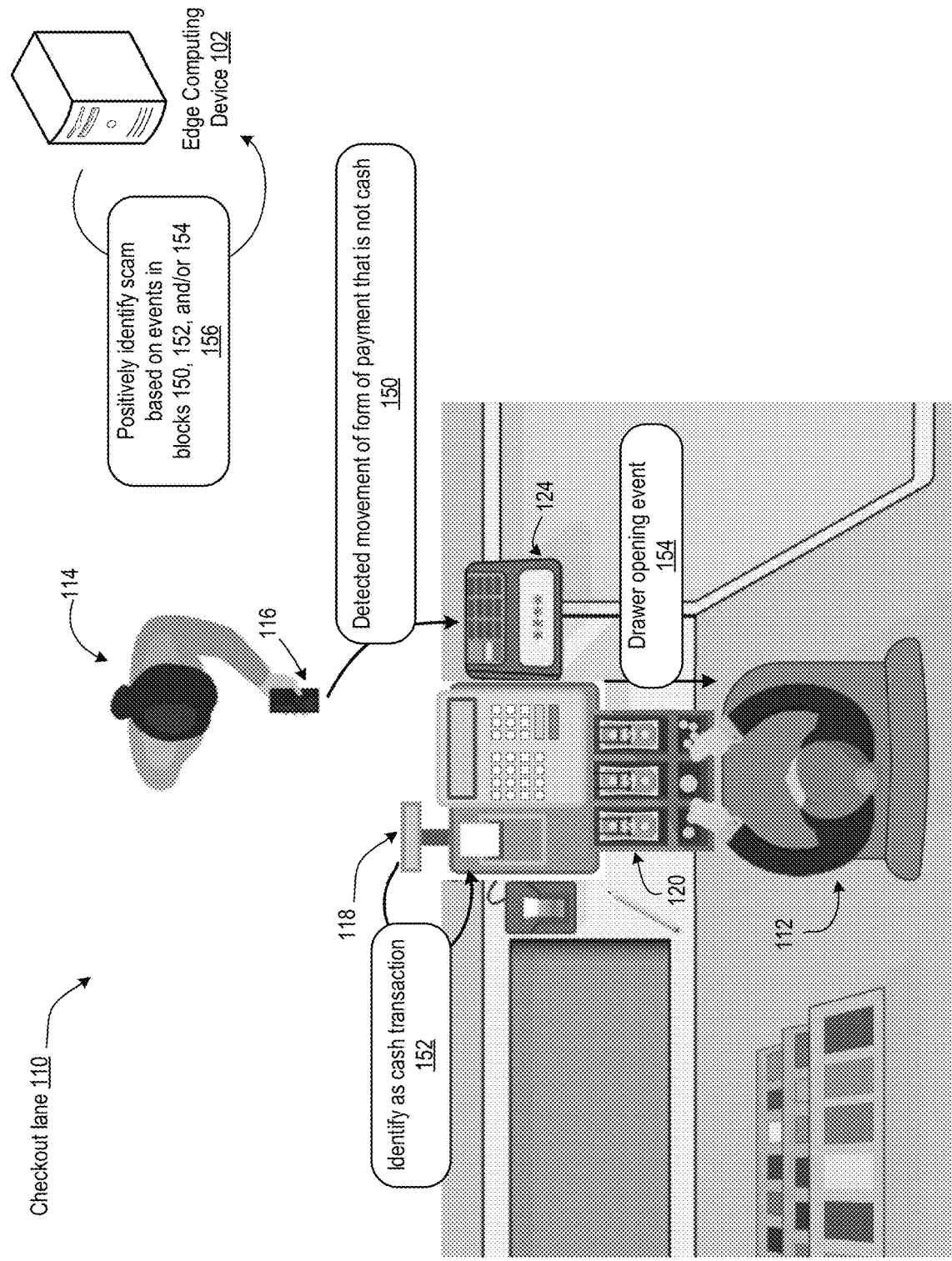
FIG. 1B is a conceptual diagram illustrating positive identification of a scam during a checkout process.

FIG. 1B is a conceptual diagram illustrating positive identification of a scam during a checkout process. FIG. 1B is described using an illustrative example of positively identifying a K1 scam, although the techniques described herein can also be used to positively identify other types of scams at POS terminals or other checkout lanes.

Here, the guest 114 is providing the card 116 as payment to the cashier 112 in the checkout lane 110. Since the card 116 is a fake card, the POS terminal 124 rejects the card 116 as payment. Therefore, the card 116 must be manually applied by the cashier 112 to the guest 114's transaction. The guest 114 can hand the card 116 to the cashier 112, who follows instructions on the card 116 to use the card 116 as a cash card.

The movement of the card 116 from the guest 114 to the cashier 112 can be detected (e.g., by a camera such as the camera 108 in FIG. 1A) as movement of a form of payment that is not cash (block 150). For example, an overhead camera can capture image data of the guest 114 handing over the card 116. The image data can be processed by the edge computing device 102 to identify that the guest 114 handed over a card as the form of payment, not cash.

Once the cashier 112 manually runs the card 116, the cash register 118 can identify that a cash transaction occurred (block 152), even though the card 116 is not actually tied to any cash. The cash register 118 assumes that a valid/proper form of payment was provided by the guest 114.

Moreover, in response to manually running the card 116 as part of a cash transaction, the drawer 120 of the cash register 118 automatically opens. This triggers a drawer opening event at the cash register 118 (block 154). The drawer opening event can be an indication provided by the cash register 118 to the edge computing device 102. The drawer opening event can also be captured in image data by the overhead camera and then provided to the edge computing device 102.

The edge computing device 102 can positively identify a scam at the checkout lane 110 (such as K1 scam) based on the events in blocks 150, 152, and/or 154 (block 156). As described throughout this disclosure, the edge computing device 102 can correlate absence of image data depicting the guest 114 providing cash payment to the cashier 112 (block 150) with the drawer opening event (block 154) and/or the transaction data indicating a cash transaction (block 152) to positively identify the K1 scam. The edge computing device 102 can also correlate one or more of the events in blocks 150, 152, and/or 154 to generate a confidence value indicating a likelihood that the scam is occurred/has occurred.

Figure 1C:
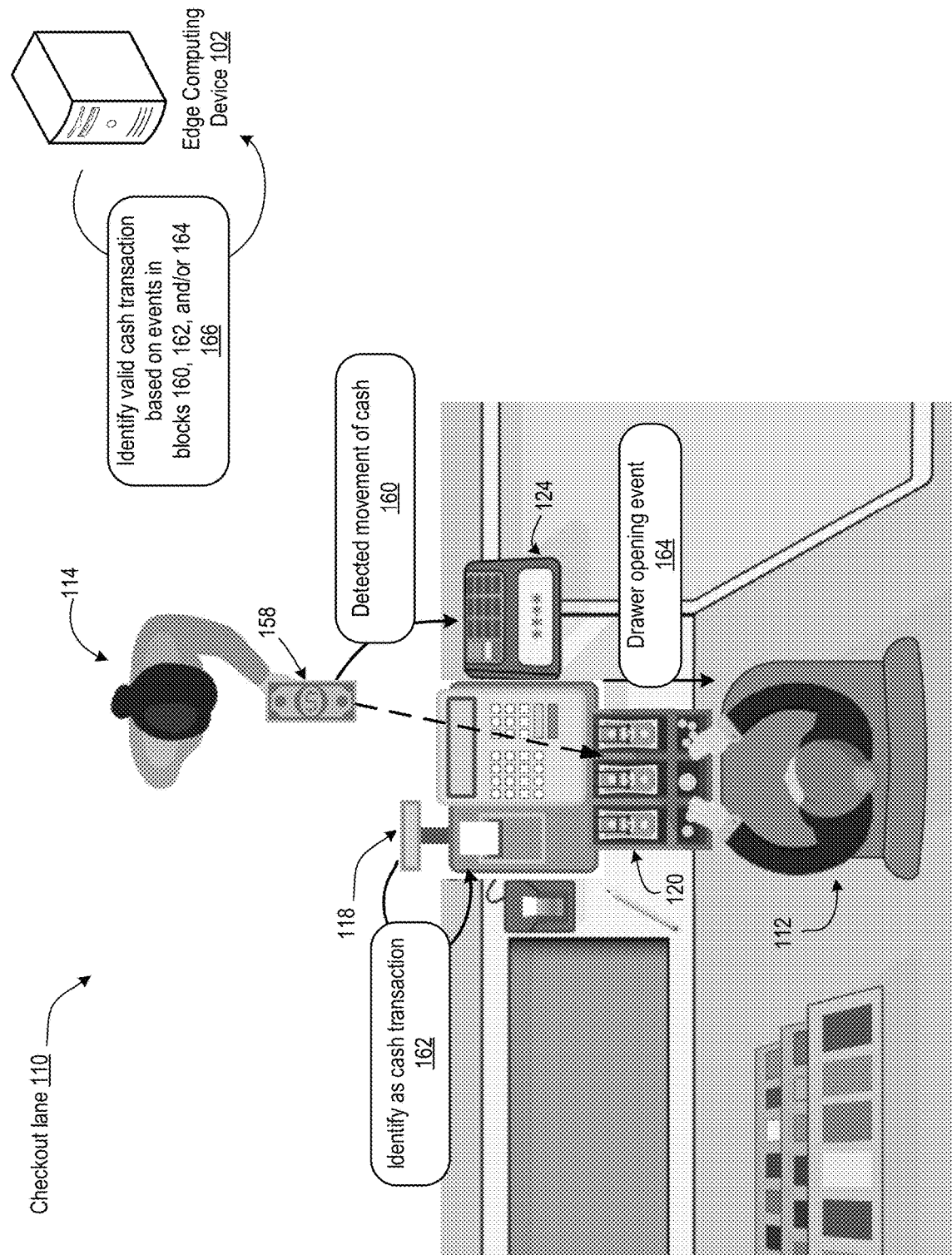
FIG. 1C is a conceptual diagram illustrating identification of a valid cash payment transaction during a checkout process.

FIG. 1C is a conceptual diagram illustrating identification of a valid cash payment transaction during a checkout process. In contrast to the example of FIG. 1B, here, the guest 114 hands cash 158 as a form of payment to the cashier 112. The cash 158 can be any type of The movement of the cash 158 from the guest 114 to the cashier 112 can be detected (e.g., by a camera such as the camera 108 in FIG. 1A) (block 160). For example, an overhead camera can capture image data of the guest 114 handing over the cash 158. The image data can be processed by the edge computing device 102 to identify that the form of payment is cash. For example, the edge computing device 102 can perform object detection techniques and/or apply a machine learning trained model to identify the form of payment in the image data and classify or label the payment as cash.

Once the cashier 112 selects options on the cash register 118, such as a button (e.g., a "K1" button), to mark the transaction as a cash transaction, the cash register 118 identifies that a cash transaction occurred (block 162).

Moreover, the drawer 120 of the cash register 118 automatically opens in response to the cashier 112's action(s) and/or identification of the transaction as a cash transaction. This triggers a drawer opening event at the cash register 118 (block 164). The drawer opening event can be an indication provided by the cash register 118 to the edge computing device 102. The drawer opening event can also be captured in image data by the overhead camera and then provided to the edge computing device 102. The edge computing device 102 can then process the image data, using object detection techniques and/or machine learning trained models to identify the drawer 120 opening at some point in time after the guest 114 hands the cash 158 to the cashier 112.

The edge computing device 102 can identify a valid cash transaction at the checkout lane 110 based on the events in blocks 160, 162, and/or 164 (block 166). As described throughout this disclosure, the edge computing device 102 can correlate the presence of the guest 114 providing the cash 158 to the cashier 112 in the image data (block 160) with the drawer opening event (block 164) and/or the transaction data indicating a cash transaction (block 162) to identify a valid cash transaction. The edge computing device 102 can correlate the data from blocks 160, 162, and/or 164 based on timestamps associated with each data. For example, the cash 158 can be detected and identified in the image data at time tO (block 160). Within a threshold amount of time from that detection and identification, the cash register 118 can identify a cash transaction (block 162) and/or the drawer 120 of the cash register 118 can open (block 164). Because the events in blocks 160, 162, and 164 all occurred within the threshold amount of time from each other, the edge computing device 102 can identify, with greater confidence, that the guest 114 provided a valid form of payment (and therefore the guest 114 is not attempting a K1 scam).

In some implementations, the edge computing device 102 may also detect and identify the cashier 112 receiving the cash 158, putting the cash 158 in the open drawer 120, optionally providing change back to the guest 114, and then closing the drawer 120. Any of these events can further be correlated with one or more of the blocks 160, 162, and 164 to increase the confidence level of a determination that the guest 114 is engaged in a valid cash transaction (consequently, the edge computing device 102 can generate a low confidence value indicating likelihood that a K1 scam occurred).

In some implementations, the edge computing device 102 may not identify a valid cash transaction in block 166. Instead, the edge computing device 102 can simply correlate the event data from one or more of the blocks 160, 162, and 164 to determine whether a scam, such as a K1 scam, can be positively identified. If a K1 scam cannot be positively identified, then the edge computing device 102 can stop processing event data associated with the current checkout process at the checkout lane 110. The edge computing device 102 can process event data again once the guest 114 leaves the checkout lane 110 and a new guest approaches the checkout lane 110 to begin a new checkout process. Such processing can beneficially reduce the use of computational resources and processing power, thereby making the edge computing device 102 lightweight and capable of quickly, accurately, and efficiently processing data from disparate data sources to positively identify K1 scams in a retail environment.

FIG. 2 is a conceptual diagram of a checkout area 200 having multiple overhead cameras 108A-B. The overhead cameras 108A-B can be CCTV cameras, surveillance cameras, or other types of imaging devices that may already be installed in the checkout area 200 of the retail environment. Image data generated by the overhead cameras 108A-B can be leveraged using the disclosed technology to quickly and efficiently identify activity at each checkout lane 110A-N in the checkout area 200 and determine whether the identified activity represents a K1 scam or other suspicious activity.

The checkout area 200 can have any number of overhead cameras. The number of overhead cameras can vary from store to store and/or based on a size of the checkout area 200. In some implementations, the checkout area 200 may have one overhead camera. In some implementations, the checkout area 200 can have one overhead camera per checkout lane (e.g., refer to FIG. 1). In yet some implementations, the checkout area 200 can have at least one overhead camera per one or more checkout lanes. Each overhead camera can be trained on an equal number of checkout lanes and/or checkout lanes that appear in series (e.g., down a line). Moreover, one or more additional overhead cameras can be retrofitted and installed in the checkout area 200 to perform the disclosed technology.

Moreover, although the edge computing device 102 is shown as a separate device from the cameras 108A-B, the edge computing device 102 can also be part of one or more of the cameras 108A-B. For example, the edge computing device 102 can be firmware or software installed on the camera 108A, the camera 108B, or both cameras. In some implementations, blocks C-E can be performed on the edge at each of the cameras 108A and 108B. For example, blocks C-E can be performed on the edge at the camera 108A whenever a cash register open event is detected at any one or more of the checkout lanes 110A, 110B, 110C, and 110D. Blocks C-E can also be performed on the edge at the camera 108B whenever a cash register open event is detected at any one or more of the checkout lanes 110E and 110N. In the example of FIG. 2, the edge computing device 102 can be separate from the cameras 108A and 108B and configured to perform the blocks C-E whenever a cash register open event is detected at any of the checkout lanes 110A-N in the checkout area 200.

In the example checkout area 200 in FIG. 2, overhead camera 108A has a field of view (FOV) 202A that includes checkout lanes 110A, 110B, 110C, and 110D. Overhead camera 108B has a FOV 202B that includes checkout lanes 110E and 110N. Other configurations are also possible, as described above (e.g., refer to FIG. 1, in which one overhead camera is trained on one checkout lane).

As an illustrative example, during a checkout process, a cashier at checkout lane 110E can scan items that a guest would like to purchase. The camera 108B, which has the FOV 202B that includes the checkout lane 110N, can generate image data of the checkout lane 110N, where the cashier is scanning the items, as well as the checkout lane 110E, where no checkout process may be occurring at a present time (block A, 204). The image data can also capture the guest providing a form of payment to the cashier at the checkout lane 110N. As described herein, the guest can provide a fake card to the cashier, which causes a cash register drawer at the checkout lane 110N to open. When the cash register drawer opens, a drawer open event can be generated by the cash register or another device/system at the checkout lane 110N. The drawer open event can be correlated with the image data using the disclosed technology (e.g., refer to FIG. 1) to determine whether the guest is attempting a scam during the checkout process, such as a K1 scam.

Still referring to FIG. 2, the camera 108B can transmit the image data of the checkout lanes 110E and 110N to the edge computing device 102 (block B-1, 206). The image data can be transmitted in real-time and/or near real-time. The image data can also be transmitted in batch and/or at predetermined time intervals (e.g., every 30 seconds, every 1 minute, every 5 minutes).

The cash register or other device/system at the checkout lane 110N can optionally transmit an indication of the cash register drawer open event to the edge computing device 102 in block B-2 (207). Block B-2 can be performed before, during, and/or after one or more blocks described in reference to FIG. 2. For example, block B-2 can occur before the camera 108B transmits the image data (block B-1, 206) and/or while the camera 108B is capturing the image data of the FOV 202B.

Upon receiving the image data, and optionally the cash register open event indication, the edge computing device 102 can identify which of the checkout lanes 110E and 110N has the cash register open event (block C, 208). For example, the edge computing device 102 can simply identify which cash register from which checkout lane transmitted the cash register open event. In other words, the edge computing device 102 can extract a unique identifier of the cash register from the indication of the cash register open event and/or a network packet that was transmitted to the edge computing device 102 with the indication.

As another example, in block C (208), the edge computing device 102 can perform object detection or other machine learning techniques on the received image data to identify movement of the cash register drawer at the checkout lane 110N. As a result of identifying movement of the cash register drawer, the edge computing device 102 can identify which of the checkout lanes 110E and 110N has the checkout process. The edge computing device 102 can apply a machine learning trained model to the image data, where the model was trained to identify and classify activities at a checkout lane in the image data. The model can be trained with machine learning techniques to identify the opening and closer of a drawer of a cash register in training image data. The model can also be trained to classify the opening and closer of the cash register drawer. The model can be trained to identify other activities at the checkout lane, such as a guest providing a form of payment to a cashier, the cashier scanning items for purchase, and/or movement of cash or another form of payment between the cash register, the cashier, and/or the guest.

As another example, in block C (208), the edge computing device 102 can identify the checkout lane 110N based on correlating identified activity in the image data with event data from devices and/or systems at the checkout lane 110N. The event data can include event-based timestamps (e.g., which can be part of transaction information, such as a current bill of the guest), which can be received from a POS terminal and/or the cash register at the checkout lane 100N. The event-based timestamp(s) can indicate a time at which one or more items were scanned during the checkout process. If the event-based timestamp(s) is within a threshold amount of time from the cash register open event (e.g., as identified in the image data using object detection techniques and/or as identified by the indication of the cash register open event), the edge computing device 102 can identify the checkout lane 110N in block C (208). In some implementations, the edge computing device 102 can also identify optical and/or audio signals in the image data indicative of a cash register open event at the checkout lane 110N.

Once the edge computing device 102 identifies the checkout lane 110N as being the location where the cash register open event occurs (or another event associated with a checkout process), the edge computing device 102 can extract a portion of the image data depicting the checkout lane 110N (block D, 210). The edge computing device 102 can use one or more image processing and/or image extraction techniques to select the portion of the image data that depicts the checkout lane 110N. The edge computing device 102 can also use one or more machine learning models that are trained to extract the portion of the image data including the checkout lane 110N.

The edge computing device 102 can then perform scam detection techniques described throughout this disclosure on the extracted portion of the image data (block E, 212). Optionally, the edge computing device 102 can poll devices and/or systems of the checkout lane 110N, such as the POS terminal and/or the cash register, for transaction data, cash register open event(s), and/or other checkout data (e.g., refer to block B-2, 207). Any of the data receives from these devices and/or systems can be correlated, by the edge computing device 102, to the absence of cash movement (or presence of cash movement) in the extracted portion of the image data to positively identify a K1 scam or other type of scam.

In some implementations, in block D (210), the edge computing device 102 can extract a portion of the image data containing a form of payment provided by the guest to the cashier at the checkout lane 110N. As a result, the disclosed technology can then be applied to the extracted portion of the image data to identify the type of payment provided by the guest and whether the type of payment is cash or card in block E (212). If the type of payment is a card, and the cash register drawer opened during the checkout process, then the edge computing device 102 can generate a confidence level indicating higher likelihood that the guest is engaging in a scam. Additionally or alternatively, the edge computing device 102 can extract a portion of the image data containing the checkout lane 110N and then determine whether movement of cash is detected from the cashier to the guest after the guest provides a card as payment and the cash register drawer opens. If there is no such movement of cash detected in the extracted portion of the image data, the edge computing device 102 can generate a confidence level indicating higher likelihood that the guest is engaging in a scam.

Although the image data may be low resolution in some implementations (e.g., because the overhead cameras 108A-B are low resolution cameras, the camera 108B has a wide FOV 202B and events at the checkout lane 110N appear small in the captured image data), the edge computing device 102 can be trained to accurately identify the absence of movement of cash and/or the movement of cash in the low resolution image data to accurately and reliably determine whether a K1 scam is occurring at the checkout lane 110N.

Figure 3:
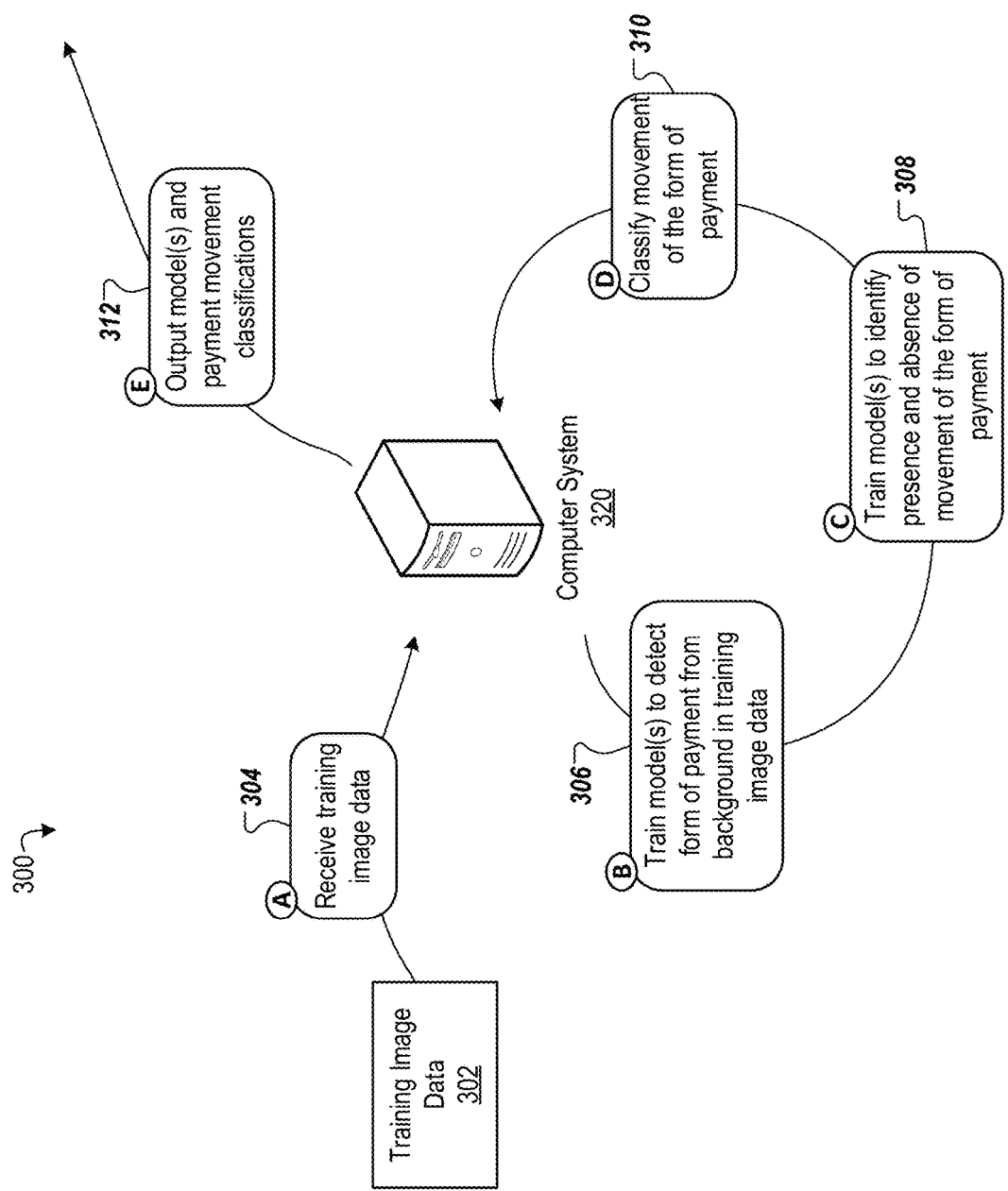
FIG. 3 is a conceptual diagram of a process to train a model that identifies movement of a form of payment in image data during a checkout process.

FIG. 3 is a conceptual diagram of a process 300 to train a model that identifies movement of a form of payment in image data during a checkout process. The process 300 can be performed by a computer system 320. The computer system 320 can be a remote computing system, a computer, a network of devices and/or systems, and/or a cloud-based system. The computer system 320 can also be the edge computing device 102, in some implementations. The computer system 320 can be configured to train and/or generate one or more models described throughout this disclosure. Training can be performed using machine learning techniques and/or processes, including but not limited to convolutional neural networks (CNNs), deep neural networks, supervised learning techniques, random forest generation, unsupervised learning techniques, etc.

The computer system 320 can generate at least one model for each retail environment in a network of retail environments. The computer system 320 can also generate at least one model to be deployed at edge computing devices in different retail environments. The computer system 320 can generate models specific to various devices, systems, and/or computing resources available in the retail environment and/or a network of retail environments. The computer system 320 can also generate models to detect different types of movement or activity in image data. For example, a model can be trained to detect presence of cash moving between a guest and a cashier. Another model can be trained to detect absence of cash moving between a guest and a cashier. Yet another model can be trained to detect a card as a form of payment provided by a guest.

Referring to the process 300, the computer system 320 can receive training image data 302 in block A (304). The training image data 302 can be retrieved from a data store. Sometimes, the training image data 302 can be received in real-time or near real-time from one or more cameras in one or more retail environments.

The training image data 302 can be captured from many cameras in many retail environments. The training image data 302 can be captured using various camera settings, including but not limited to angle, point of view, sharpness, resolution, lighting, zoom, etc. The training image data 302 can be captured before runtime use of the disclosed technology. In some implementations, the images that are captured and used during runtime scam detection, can also be used for training the models described herein. The training image data 302 may also be annotated. The data 302 can be annotated with labels indicating features that are correlated with positive scam identifications, such as K1 scams and other types of scams that may occur at POS terminals or other checkout lanes (e.g., an image showing a guest handing over a card and a cash register drawer opening but no movement of cash). The data 302 can also be annotated with labels indicating features that are correlated with normal checkout processes (e.g., an image showing a guest handing over cash, a cash register drawer opening, and a cashier handing change back to the guest).

The training image data 302 can also be annotated with labels indicating features that correspond to different types of payments. For example, cash bills, coins, checks, credit cards, gift cards, mobile phones, and other forms of payment can be annotated in the training image data 302. The training image data 302 can also be annotated with different types of movements, including but not limited to a cash register drawer opening, a guest handing over a card or cash to a cashier, the cashier taking the cash or card, the cashier taking money out of the cash register drawer, and/or the cashier handing change over to the guest. One or more other types of movement can be annotated in the training image data 302.

Annotating various features in the training image data 302 can provide for improved accuracy in training the models described herein to detect and classify such features during runtime use. The training image data 302, or a portion thereof, can be manually annotated by one or more users. The training image data 302, or another portion thereof, can additionally or alternatively be annotated automatically by a computer system, such as the computer system 320.

Once the computer system 320 receives the training image data 302, the computer system 320 can train at least one model to detect a form of payment from a background in the training image data 302 (block B, 306). Object detection techniques can be used to identify the form of payment in the image data 302 and generate a bounding box around it. The form of payment can also be extracted from the training image data 302, in some implementations. For example, the bounding box containing the form of payment can be extracted from the image data 302. As another example, the form of payment can be extracted from the background of the training image data 302. The model(s) can also be trained in block 306 to identify a type of payment detected in the training image data 302. For example, using the labels and annotations described above, the model(s) can be trained to identify features of the form of payment indicative of cash money, coins, checks, credit cards, gift cards, mobile phone wallets, and other types of payment that may be used during a checkout process.

The computer system 320 can also train the model(s) to identify presence and/or absence of movement of the form of payment in the training image data 302 (block C, 308). For example, the model(s) can be trained to identify movement of a card from the guest to the cashier. Additionally or alternatively, the model(s) can be trained to identify a cash register drawer opening in response to the guest handing over the card. This combination of identifications can indicate some likelihood of a scam. The model(s) can be trained to identify movement of cash from the guest to the cashier. Additionally or alternatively, the model(s) can be trained to identify the cash register drawer opening and the cashier putting the cash inside the drawer before closing the drawer. This combination of identifications can indicate that the guest is performing a normal checkout process (they are not trying to scam the cashier). Using the annotations and labels described above, the model(s) can be trained to identify movements that include, but are not limited to, a guest handing a card over to a cashier, the guest handing over cash to the cashier, the form of payment being exchanged between hands of the guest and the cashier, the cashier closing a cash register drawer without putting cash into the drawer, the cashier closing the cash register drawer without giving the guest change, the cashier taking change out of the cash register drawer and handing the change over to the guest, etc.

The computer system 320 can classify the movement of the form of payment in block D (310). For example, the computer system 320 can identify and classify movements that are likely indicative of the guest engaging in a scam, such as a K1 scam (e.g., handing over a card, cash register drawer opening, no movement of actual cash between hands of the guest and cashier). The computer system 320 can identify and classify movements that are likely indicative of a normal checkout process (e.g., guest swiping a card, guest handing over a card to the cashier but the cash register drawer remaining closed, guest handing over cash and the cash register drawer opening, exchanging change from hands of the cashier to the guest in response to the guest paying with cash.

Classifying movements in block D (310) can optionally include generating confidence values indicating likelihood of a particular movement identified in the training image data 302. Higher confidence values can be assigned to movements that are more apparently identified/captured in the image data whereas lower confidence values can be assigned to movements that may not be as apparent in the image data (e.g., small movements of the guest selecting different forms of payment, movement of the guest providing one form of payment and then presenting another form of payment). Classifying movements can also optionally include assigning confidence values indicating likelihood that the classified movement corresponds to a type of scam, as described throughout this disclosure. The confidence values can be assigned a numeric, integer, and/or float value. The confidence values can be assigned on a scale ranging between 0 to 100, 0 to 10, 0 to 50, 1 to 100, 1 to 50, 1 to 10, etc. In some implementations, the confidence values can also be string values and/or Booleans.

In block E (312), the computer system 320 can output the model(s) and the payment movement classifications. Outputting can include storing the model(s) and/or classifications in a data store, as described herein. Outputting can also include transmitting the model(s) and/or classifications to an edge computing device 102 for runtime deployment/use.

The process 300 in FIG. 3 can also be performed to continuously improve the model(s) that are used and described in this disclosure. In some implementations, a model can be trained using the process 300 only to detect a type of payment in the training image data 302. Another model can be trained to detect a type of movement of the payment (e.g., between the guest and the cashier). Yet another model can be trained to detect activity at the cash register, such as the drawer opening and/or closing. One or more additional or fewer models may also be generated and trained using the disclosed techniques.

Figure 4A:
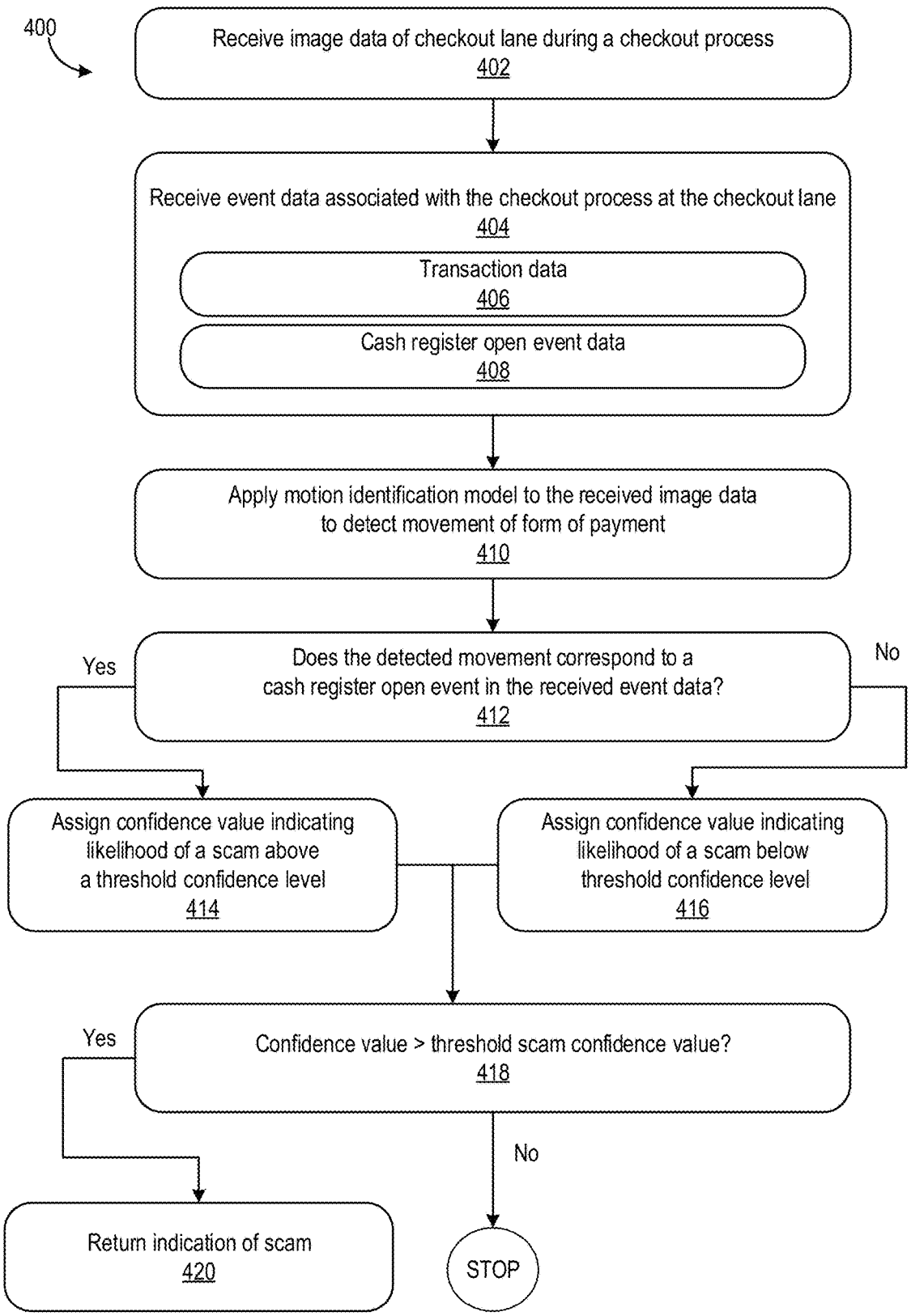
FIG. 4A is a flowchart of a process for detecting a scam during a checkout process based on image data and checkout event data.

FIG. 4A is a flowchart of a process 400 for detecting a scam during a checkout process based on image data and checkout event data. In brief, image data captured of a checkout lane having a cash register can be analyzed to determine whether cash is being moved around (e.g., between a guest and a cashier at the checkout lane). The analyzed image data can be compared to transaction data, checkout data, or other indications and event data from devices and/or systems at the checkout lane (or more generally in the retail environment) to determine whether the guest is involved in a scam. For example, a K1 scam can be identified when checkout data indicates a drawer of the cash register opened but the guest provided a card as payment to the cashier rather than cash money. A confidence value can also be assigned indicating likelihood that the guest is involved in a K1 scam, based on the associations that are made.

The process 400 can be performed by the edge computing device 102. The process 400 can also be performed by one or more other computing systems, devices, computers, networks, cloud-based systems, and/or cloud-based services. For illustrative purposes, the process 400 is described from the perspective of an edge computing device.

Referring to the process 400 in FIG. 4A, the edge computing device can receive image data of a checkout lane during a checkout process in block 402. Refer to blocks A and B (130 and 132, respectively) in FIG. 1A for further discussion.

In block 404, the edge computing device can receive event data associated with the checkout process at the checkout lane. For example, the edge computing device can receive transaction data (block 406). The transaction data can indicate quantities of items to be purchased, a total purchase price, guest account information, payment information, an amount of change returned to the guest, whether the transaction is a cash transaction or a card transaction, a timestamp at which the guest provides payment and the checkout process is completed, etc. The edge computing device can additionally or alternatively receive cash register open event data (block 408). The cash register open event data can indicate a timestamp at which the drawer opens, a timestamp at which the drawer closes, whether the transaction is a cash transaction or a card transaction, etc. Refer to block C (134) in FIG. 1A for further discussion.

In block 410, the edge computing device can apply a motion identification model to the received image data to detect movement of a form of payment therein. Refer to block D (136) in FIG. 1A for further discussion. The model can be trained using the process 300 described further in FIG. 3. By applying the model, the edge computing device can identify a form of payment presented by the guest, movement of the payment from the guest to the cashier, and one or more actions taken by the cashier in response to receiving the payment from the guest (e.g., putting cash in a cash register drawer, manually scanning a card presented to the cashier by the guest, giving change back to the guest). Therefore, the edge computing device can identify flow of payment from the guest to the cashier. The edge computing device can also identify flow of payment from the cashier to the guest. For example, the edge computing device can identify the guest handing over a card, the cash register drawer opening, and the cashier handing cash back to the guest. This may be classified or otherwise identified as a particular type of scam, such as a K1 scam.

The edge computing device can determine whether the detected movement corresponds to a cash register open event in the received event data (block 412). Refer to block E (138) in FIG. 1A for further discussion. For example, if the guest hands over cash and the edge computing device receives a cash register open event within a threshold amount of time after the guest is identified as handing over cash, then the edge computing device may not associate the cash movement with the event. After all, the guest is likely engaging in a normal checkout process (and therefore providing a proper form of payment). On the other hand, if the guest hands over a card and the edge computing device receives a cash register open event within a threshold amount of time thereafter, then the cash movement can be associated with the event and the guest is likely attempting a scam. This association can be made with higher confidence if, for example, the transaction data indicates that the checkout process was completed as a cash transaction.

In blocks 410 and/or 412, the edge computing device can determine whether cash movement is detected within a threshold amount of time of the cash register open event occurring (or vice versa). For example, if cash movement occurs before the event, then the guest is likely giving cash as proper form of payment. If there is no movement of cash before or after the event and the cash register drawer simply opens and then is closed, the guest might have provided an invalid form of payment (e.g., fake credit card, fake gift card, fake cash card) and therefore is attempting a scam.

In block 412, if an association is made between the movement and the cash register open event, the edge computing device can assign a confidence value indicating likelihood of a scam that is above a threshold confidence level (block 414). The edge computing device then can proceed to block 418, described further below. Refer to block F (140) in FIG. 1A and the process 300 in FIG. 3 for further discussion about assigning the confidence value.

If an association is not made in block 412, the edge computing device can assign a confidence value indicating likelihood of a scam that is below a threshold confidence level (block 416). In other words, the edge computing device is less certain that the guest is engaging in a scam because the guest may be providing a proper form of payment and/or the edge computing device may not receive a cash register drawer open event. The edge computing device can then proceed to block 418.

The threshold confidence level in block 416 can be the same as the threshold confidence level in block 414. The threshold confidence level in block 416 can alternatively be different than the threshold confidence level in block 414. Sometimes, if the association is not made in block 412, the edge computing device may simply stop the process 400 and/or return to block 402. In other words, the edge computing device may only assign a confidence value when the guest is likely engaging in a scam (e.g., detected movement of a card in the image data corresponds to a cash register open event). The process 400 can therefore be used to positively identify scams.

In block 418, the edge computing device can determine whether the assigned confidence value exceeds a threshold scam confidence value. Any other scam detection criteria can be used to determine whether the guest actually poses a risk to the retail environment. Refer to block F (140) in FIG. 1A for further discussion.

The higher the confidence value, the higher likelihood that the guest is engaging in a scam. Accordingly, if the confidence value exceeds the threshold value in block 418, the edge computing device can return an indication of the scam (block 420). Refer to block G (142) in FIG. 1A for further discussion.

Returning the indication can include transmitting an alert, notification, message, prompt, or instructions to the cash register. The cash register can present the indication to the cashier (e.g., in a GUI display, by flashing a light on the cash register, or some other form of alert/notification), thereby notifying the cashier that the checkout process is suspicious. In some implementations, the cash register can automatically perform some action in response to the indication, such as preventing the transaction from being completed, prompting the guest for another form of payment, preventing the cash register drawer from opening, etc.

Returning the indication can also include transmitting the indication to an employee device. The employee device can be used by the cashier, an in-store employee, safety and security personnel, and/or law enforcement. As described in reference to block G (142) in FIG. 1A, the indication can be used by a relevant stakeholder to determine and/or perform one or more actions to stop the guest from leaving the retail environment, from completing the checkout process, and/or otherwise performing the scam. The indication may also be used by the edge computing device and/or the employee computing device to generate a notification to be transmitted to law enforcement.

If, in block 418, the confidence value does not exceed the threshold value, the edge computing device can stop the process 400. In other words, the edge computing device may be less certain that the guest is actually engaging in a scam. The edge computing device can also stop the process 400 if the guest is performing a proper/valid checkout process with a proper form of payment. In some implementations, the edge computing device can return to block 402 instead of stopping the process 400. Moreover, after performing the block 420, the edge computing device can also return to block 402.

Figure 4B:
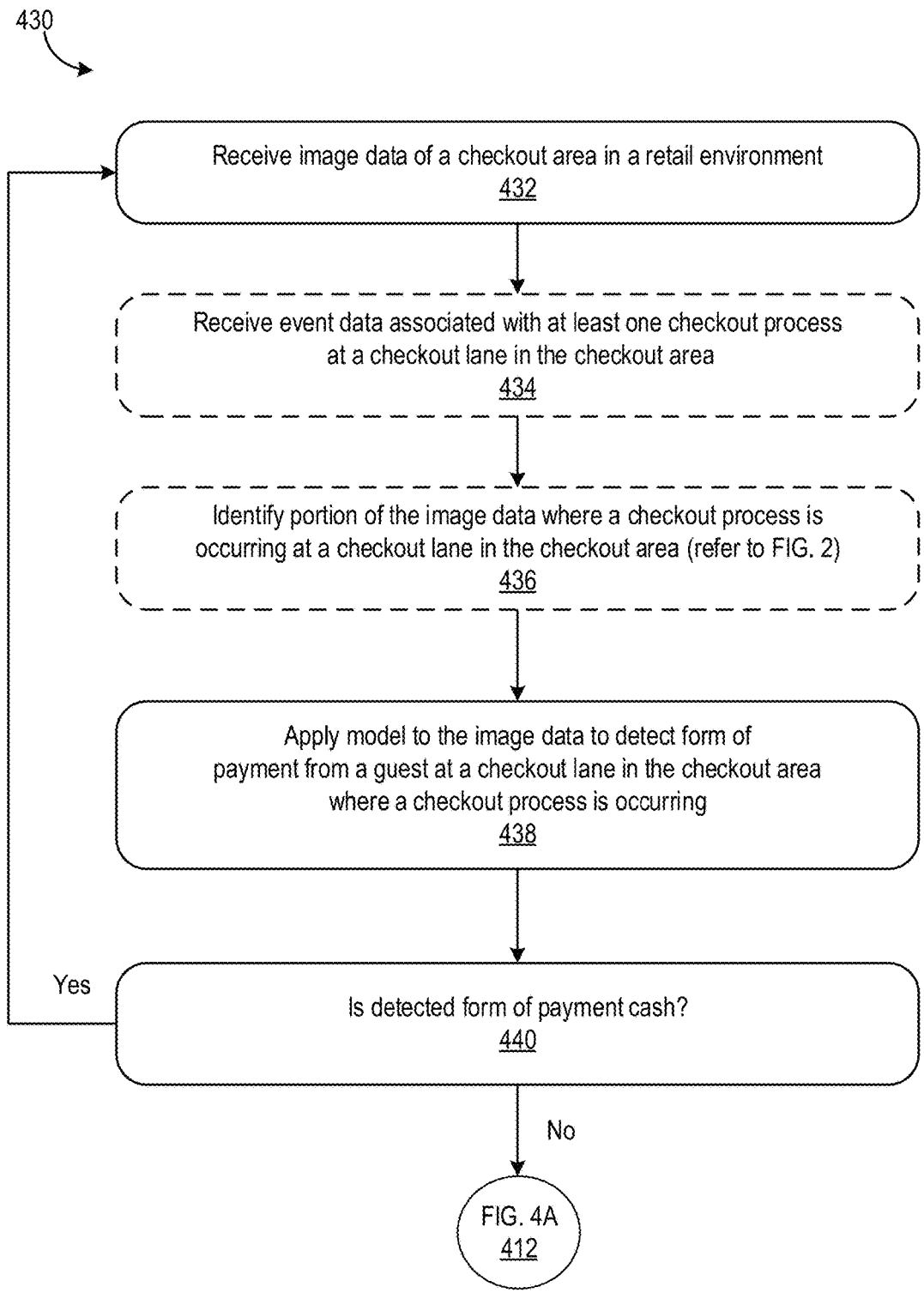
FIG. 4B is a flowchart of another example process for detecting a scam during a checkout process.

FIG. 4B is a flowchart of another example process 430 for detecting a scam during a checkout process. The process 430 can be computationally efficient and utilize less processing power than other techniques since the process 430 can simply be performed to determine whether a guest is paying with cash during the checkout process. Only if the guest is not paying with cash (e.g., the guest pays with some type of card) will additionally processing be performed to detect a scam and/or likelihood of the scam, such as a K1 scam. As a result, the process 430 can be beneficial to save compute resources during runtime for efficient, quick, and accurate detection of scams.

The process 430 can be performed by the edge computing device 102. The process 430 can also be performed by one or more other computing systems, devices, computers, networks, cloud-based systems, and/or cloud-based services. For illustrative purposes, the process 430 is described from the perspective of an edge computing device.

Referring to the process 430 in FIG. 4B, the edge computing device can receive image data of a checkout area in a retail environment in block 432. Refer to block 402 in the process 400 of FIG. 4A for further discussion.

The edge computing device can optionally receive event data associated with at least one checkout process at a checkout lane in the checkout area in block 434. The event data can include transaction data and/or cash register open event data. The event data can also include corresponding timestamps, which can be used by the edge computing device to correlate activity during checkout processes in the image data with the event data. Refer to blocks 404-408 in the process 400 of FIG. 4A for further discussion.

Optionally, the edge computing device can identify a portion of the image data where a checkout process is occurring at a checkout lane in the checkout area in block 436. For example, where the image data captures multiple checkout lanes, the techniques described in FIG. 2 can be used to identify and/or extract the portion of the image data containing a checkout lane having a checkout process. Refer to FIG. 2 for further discussion. In some implementations, the edge computing device can apply one or more machine learning models to the image data in order to identify if the checkout lane (or any checkout lane) in the image data has a checkout process. If no checkout process is occurring, then the process 430 may be stopped and/or the edge computing device may return to block 432 and continue to receive and monitor the image data for presence of a checkout process. Once a checkout process is detected, the process 430 can continue. Performing the process 430 as described herein can beneficially reduce an amount of compute resources, processing power, network bandwidth, and/or CPU cycles that are used during runtime. As a result, the edge computing device can be lightweight, quick, efficient, and accurate in processing the image data and detecting scams in real-time and/or near real-time (for example, only using such resources when a checkout process is detected, only using such resources when a form of payment used by a guest is not cash, etc.).

Blocks 434 and/or 436 can be performed in any order. Blocks 434 and/or 436 can be performed before, during or after each other. Sometimes, block 434 can be performed before block 432. Sometimes, block 434 can be performed and block 436 may not be performed. Sometimes, block 436 may be performed and block 434 may not be performed. Sometimes, neither blocks 434 and 436 may be performed in the process 430. One or more other variations are also possible.

The edge computing device can apply a model to the image data to detect a form of payment from a guest at a checkout lane in the checkout area where a checkout process is occurring (block 438). The model can be one or more of the models described throughout this disclosure. For example, the model can be a motion identification model trained using the techniques described in FIG. 3. Refer to block 410 in the process 400 of FIG. 4A for further discussion about detecting the form of payment in the image data.

The edge computing device can determine whether the detected form of payment is cash in block 440. Using one or more of the machine learning trained models described throughout this disclosure, the edge computing device can process the image data. Processing the image data can include identifying the form of payment and classifying the form of payment. The form of payment can be classified as cash and/or a type of card, such as a credit card, debit card, gift card, cash card, etc. For example, a model can be trained to identify visual features of cash, such as a color (e.g., green), one or more patterns or writing on the cash (e.g., a president's head or another human face on the cash, a numeric value indicating the value of the cash near at least one corner of the cash), and/or a size and/or shape of the cash (e.g., narrow rectangular shape). The model can also be used to assign a confidence value indicating likelihood that the form of payment is cash. The higher the confidence value, the higher the likelihood that the form of payment is cash. The confidence value can be a numeric value, integer, and/or float value on a predetermined scale (e.g., 0 to 1, 0 to 10, 0 to 100, 1 to 10, 1 to 100, etc.). The confidence value can also be a string value and/or a Boolean value. In block 440, the edge computing device can also determine a movement of the payment, such as the guest handing the payment to the cash register (e.g., the payment moving towards a cash register or other area proximate the cashier at the checkout lane) and/or movement of the payment towards the guest (e.g., payment moving from the cash register over the counter and towards the guest). Refer to block 410 in the process 400 of FIG. 4A for further discussion.

If the detected form of payment is cash (e.g., a confidence value for the detection exceeds some threshold confidence level), then the edge computing device can return to block 432 and loop back through the process 430. In other words, the guest is paying with a proper form of payment and therefore the guest is most likely not performing a scam. Since the form of payment may be positively identified as cash and the guest therefore is not performing a scam, such as a K1 scam, the rest of the processing described herein to identify a scam need not be performed. This can save available compute resources and provide for more efficient and accurate processing on the edge.

If the detected form of payment is not cash (e.g., the confidence value for the detection is less than some threshold confidence level, the edge computing device detected a card as the form of payment in block 440), then the edge computing device can proceed to block 412 in the process 400 of FIG. 4A. In other words, since the guest is not paying with cash, it may be possible that the guest will or has attempted to scam the cashier. Therefore, the edge computing device can continue through the process 400 to detect and/or determine likelihood of a scam occurring during the checkout process. Refer to the process 400 in FIG. 4A for further discussion.

Figure 4C:
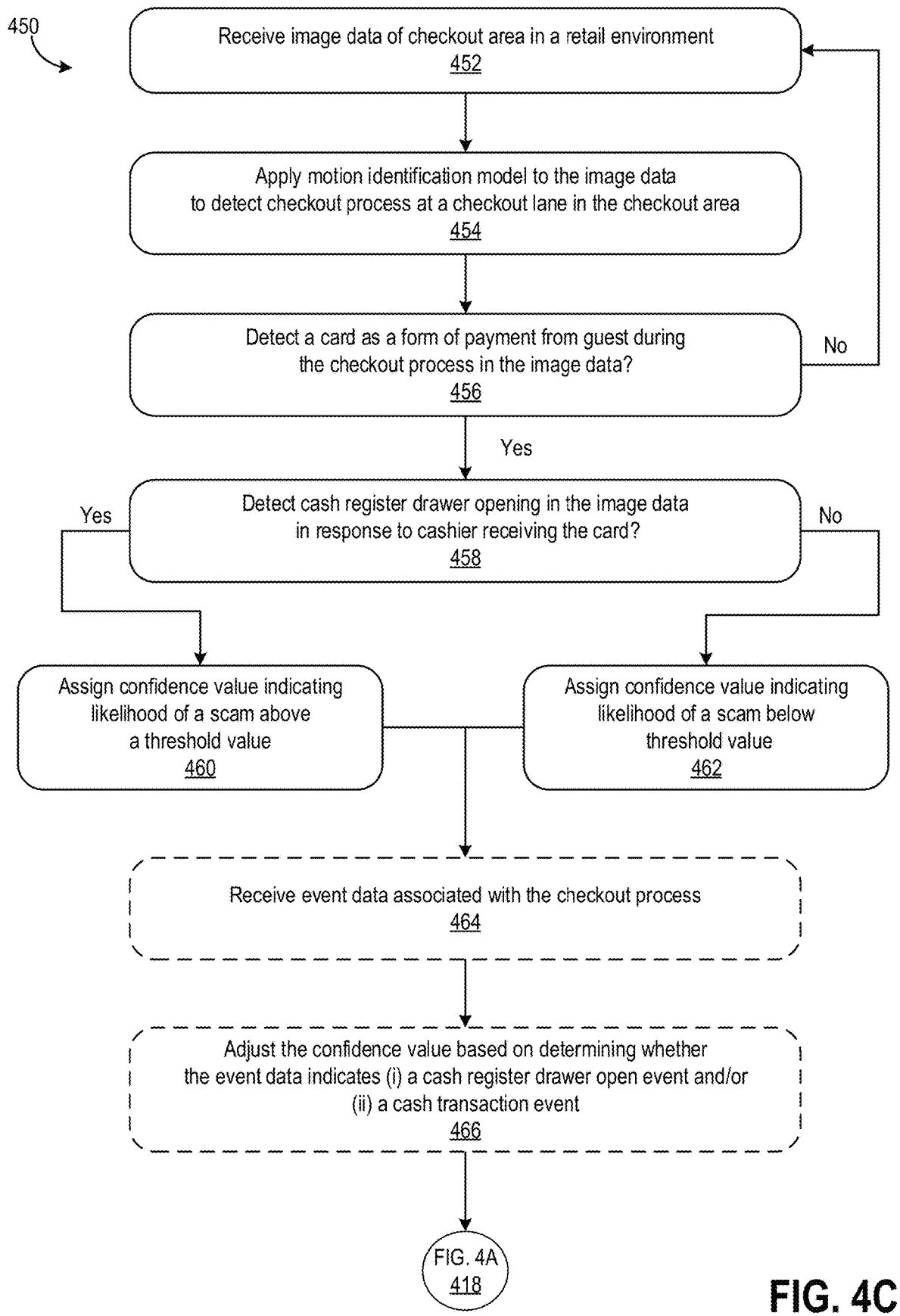
FIG. 4C is a flowchart of another example process for detecting a scam during a checkout process based on image data.

FIG. 4C is a flowchart of another example process 450 for detecting a scam during a checkout process based on image data. In the alternative process 450, a K1 scam, for example, may be detected using only image data of a checkout lane during a checkout process. Therefore, the process 450 can leverage fewer compute resources and consume less network bandwidth than if image data were to be correlated with event data, as described throughout this disclosure.

The process 450 can be performed by the edge computing device 102. The process 450 can also be performed by one or more other computing systems, devices, computers, networks, cloud-based systems, and/or cloud-based services. For illustrative purposes, the process 450 is described from the perspective of an edge computing device.

Referring to the process 450 in FIG. 4C, the edge computing device can receive image data of a checkout area in a retail environment in block 452. Refer to block 402 in the process 400 of FIG. 4A.

The edge computing device can apply a motion identification model to the image data to detect a checkout process at a checkout lane in the checkout area in block 454. As described in reference to FIG. 2, image processing techniques can be performed by the edge computing device to identify which checkout lane in the checkout area has a checkout process. The edge computing device can apply one or more models that have been trained to identify movement and/or other events in the image data that correspond to a checkout process. For example, a model can be trained to identify items being unloaded from a cart or basket onto a conveyor belt at a checkout lane. The model can be trained to identify items on the conveyor belt. The model can be trained to identify scanning actions performed by a cashier at the checkout lane. The model can be trained to identify bagging of scanned items at the checkout lane. The model can be trained to identify movement of items around the checkout lane. The model can also be trained to identify movement of forms of payment between a guest and the cashier at the checkout lane. The model can also be trained to identify system events at the checkout lane, such as flashing lights, audio signals made by one or more components when an item is scanned and/or moved around the checkout lane, and/or other visual signals. The model can be trained to identify one or more other actions or events at the checkout lane. Refer to block C (208) in FIG. 2. Once the checkout process is identified at the checkout lane in the checkout area, the edge computing device can generate a bounding box around the particular checkout lane. The edge computing device can also extract a portion of the image data having the particular checkout lane for further processing and analysis described further below.

The edge computing device can determine whether a card is detected as a form of payment from a guest during the checkout process in the image data (block 456). Using any of the techniques described herein, the edge computing device can identify and/or classify the form of payment appearing at the checkout lane having the checkout process. Refer to block 410 in the process 400 of FIG. 4A and block 438 in the process 430 in FIG. 4B for further discussion.

If a card is not detected as the form of payment, the guest is likely paying with cash and the edge computing device can return to block 452 to repeat through the process 450. In other words, the edge computing device may not further process the image data to detect and/or determine a likelihood of a scam at the particular checkout lane. Rather, the edge computing device can continue to receive image data of the checkout area. The edge computing device can continue to process the image data to identify other checkout processes at other checkout lanes in the checkout area. If other checkout processes are identified in the image data, the edge computing device can continue through the process 450 to determine whether a scam is occurring during any of those checkout processes.

If a card is detected as the form of payment, the edge computing device can determine whether a cash register drawer is detected as opening or opened in the image data in response to a cashier receiving the card from the guest (block 458). For example, the edge computing device can process the image data of the particular checkout lane to determine whether a cash register drawer is open or has been opened. The edge computing device can apply one or more models that have been trained to identify, in image data, a cash register drawer as it is opened and/or when it is already open. The model(s) can generate a confidence value indicating likelihood that the cash register drawer is open. Moreover, the edge computing device can determine whether the cash register drawer is opening or opened within a threshold amount of time since detecting the card. As an illustrative example, the threshold amount of time can be long (e.g., 15 seconds, seconds, 30 seconds, 1 minute) since the cashier has to manually run the card so that the cash register registers the card as a cash card before the drawer can open. As another example, the threshold amount of time can be short (e.g., 15 seconds, 10 second, 5 seconds, 2 seconds) for when the drawer is detected as already being open because if the card is being run as a cash card, then the cashier should not be moving cash between the cash register drawer and the guest—the cashier should simply close the drawer once it is opened. One or more other threshold amounts of time can be used in block 458.

If the cash register drawer opens or is opened (e.g., within a threshold amount of time of the card being detected and/or movement of the card from the guest to the cashier), the edge computing device can assign a confidence value indicating a likelihood of a scam that is above a threshold value in block 460. Because the cash register drawer was detected as being open or opening in response to the guest providing a card payment, there is a higher likelihood that the guest is performing a scam than if cash register drawer was not detected as opening or being open. Accordingly, a higher confidence value can be assigned to the particular checkout process in the image data. The edge computing device can then optionally proceed to block 464, described further below. Sometimes the process 450 can stop. Sometimes, the edge computing device can proceed to block 418 in the process 400 of FIG. 4A.

If the cash register drawer does not open or is not opened in block 458 (e.g., within the threshold amount of time), the edge computing device can assign a confidence value indicating a likelihood of a scam that is below a threshold value (block 462). The threshold value in block 462 can be the same as the threshold value in block 460. The threshold values can also be different. Since the cash register drawer was not detected as opening or being open, or the drawer opened during a time that was not within the threshold amount of time, there is a lower likelihood that the guest is performing a scam. Therefore, the confidence value can be lower than the assigned confidence value in block 460. After assigning the confidence value in block 462, the edge computing device can optionally proceed to block 464, described further below. Sometimes the process 450 can stop. Sometimes, the edge computing device can proceed to block 418 in the process 400 of FIG. 4A.

In block 464, the edge computing device can optionally receive event data associated with the checkout process. Refer to blocks 404-408 in the process 400 of FIG. 4A for further discussion. Moreover, in some implementations, block 464 can be performed before, during, or after one or more other blocks in the process 450. For example, the block 464 can be performed before, after, or at a same time as block 452. In some implementations, the event data received in block 464 can be used to detect or confirm detection of the checkout process in the image data in block 454.

The edge computing device can optionally adjust the confidence value based on determining whether the event data indicates (i) a cash register drawer open event and/or (ii) a cash transaction event (block 466). For example, if the drawer opens, the cash register can generate an event notification indicating that the drawer opened. The cash register can transmit the event notification to the edge computing device. This event notification can be used to confirm the correlation of the card payment and drawer opening made by the edge computing device. Thus, the confidence value that the guest is engaging in a scam can increase (e.g., increase by a threshold amount). As another example, if the cash register registers the transaction as a cash transaction, this event notification, in combination with the edge computing device identifying the card as payment can increase the confidence value that the guest is engaging in a scam. On the other hand, for example, if the cash register provides transaction data to the edge computing device indicating that the guest paid with a card, then the edge computing device can lower the assigned confidence value because it is less likely that the guest is engaging in a scam (after all, the guest's card was processed for payment to complete the checkout process).

In some implementations, blocks 464 and/or 466 can be performed at other points in time in the process 450. For example, blocks 464 and/or 466 can be performed before and/or as part of assigning the confidence values in blocks 460 and/or 462.

After optionally adjusting the confidence value in block 466, the edge computing device can proceed to block 418 in the process 400 of FIG. 4A, described above, to determine whether to return an indication of a K1 scam detection. Sometimes, the edge computing device can stop the process 450.

Figure 5:
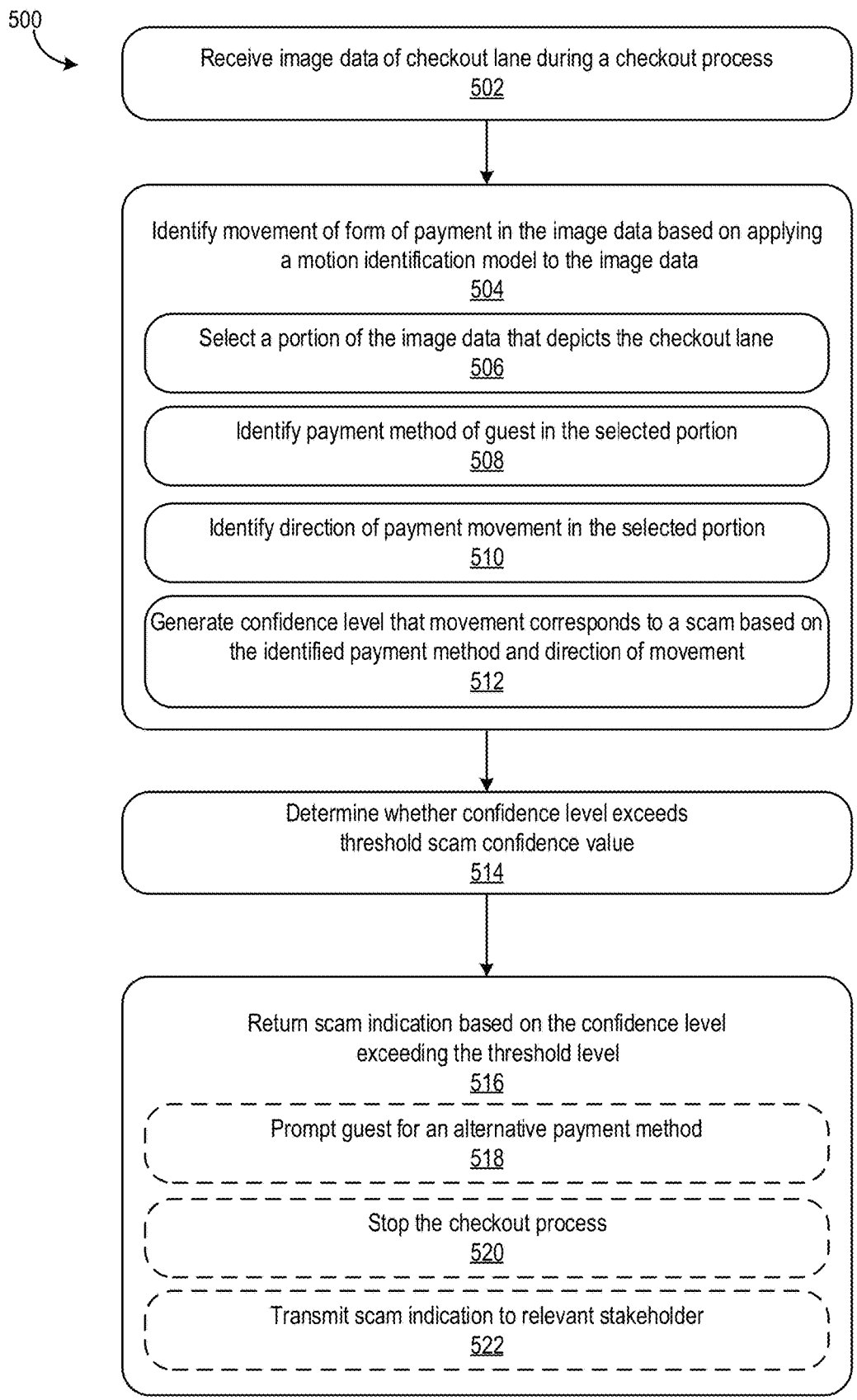
FIG. 5 is a flowchart of a process for determining whether movement of a form of payment in image data corresponds to a scam at a POS terminal or other checkout lane.

FIG. 5 is a flowchart of a process 500 for determining whether movement of a form of payment in image data corresponds to a scam at a POS terminal or other checkout lane. The process 500 can be performed based on processing only the image data. As a result, minimal compute resources can be used to process the image data and correlate system-based determinations from the processing with potential scams, such as K1 scams. The process 500 can therefore provide for efficient and lightweight processing on the edge to make real-time and/or near real-time determinations of whether a scam is occurring during a checkout process.

The process 500 can be performed by the edge computing device 102. The process 500 can also be performed by one or more other computing systems, devices, computers, networks, cloud-based systems, and/or cloud-based services. For illustrative purposes, the process 500 is described from the perspective of an edge computing device.

Referring to the process 500 in FIG. 5, the edge computing device can receive image data of a checkout lane during a checkout process in block 502. Refer to block 402 in the process 400 of FIG. 4A.

In block 504, the edge computing device can identify movement of a form of payment in the image data based on applying a motion identification model to the image data. Refer to block 410 in the process 400 of FIG. 4A for further discussion.

For example, the edge computing device can select a portion of the image data that depicts the checkout lane (block 506). Refer to FIG. 2 and block 436 in the process 430 of FIG. 4B for further discussion about identifying the portion of the image data having a checkout process.

The edge computing device can identify a payment method of a guest in the selected portion (block 508). Refer to block 410 in the process 400 of FIG. 4A and blocks 454-456 in the process 450 of FIG. 4C for further discussion.

The edge computing device can identify a direction of payment movement in the selected portion, if any (block 510). For example, the edge computing device can apply one or more models that have been trained to identify and classify movement (e.g., velocity, speed, directionality, position, orientation) of different forms of payment that can be provided during a checkout process. The model can be trained to compare location of the form of payment across a continuous stream of images (e.g., a video feed) and/or across one or more consecutive still images to determine the movement of the form of payment. Comparing the location of the form of payment across images can include identifying and counting and comparing a quantity of pixels in the image data that correspond to the form of payment in each image.

The model can be trained to identify and classify movements including but not limited to: the guest pulling the form of payment out of a bag, wallet, clothing item, etc., the guest handing the form of payment over to the cashier, the cashier taking hold of the form of payment, the cashier bringing the form of payment closer to their body and/or the cash register, the cashier providing the form of payment to the guest, the cashier hovering over an open cash register drawer, the cashier grabbing something from the open drawer, the cashier handing the grabbed item to the guest, the cashier closing the drawer, the cashier pressing a button on the cash register to open the drawer after receiving the form of payment from the guest, the cashier swiping, scanning, and/or tapping the form of payment using a device at the checkout lane (e.g., POS terminal, scanning device), and/or the guest swiping, scanning, and/or tapping the form of payment using a device at the checkout lane (e.g., POS terminal). The edge computing device can identify, classify, and/or score one or more other types of movements using the one or more models described herein.

Moreover, the model can be trained to classify movements as indicative of scams, such as K1 scams. For example, the model can classify a combination of (1) movement of a card towards the cashier with (2) an open movement of the cash register drawer as a potential K1 scam. As another example, the model can classify an open movement of the cash register drawer as a potential K1 scam if no other movements are detected within a threshold amount of time before and/or after the open movement. One or more other movements indicative of a K1 scam can be identified and classified by the model.

The edge computing device can generate a confidence level that the payment movement corresponds to a scam, such as a K1 scam based on the identified payment method and the direction of payment movement (block 512). The confidence level can be a numeric, integer, and/or float value. The confidence level can be assigned on a numeric scale having a range including and/or between 0 to 1, 0 to 10, 0 to 100, 1 to 10, 1 to 100, etc. One or more other scales may be used. Moreover, the confidence level can vary depending on a type of the scam that is detected at the POS terminal or other checkout lane. The edge computing device can assign a confidence level value indicating likelihood that the identified movement corresponds to a K1 scam. The edge computing device can also assign a confidence level value indicating likelihood that the edge computing device accurately identified the movement in the image data.

For example, the edge computing device can assign a higher confidence level value (e.g., a value above a threshold confidence level) if the payment method is identified as a card, the guest hands the card to the cashier, and/or the cash register drawer opens in response to the cashier receiving the card and performing some manual processing of the card at the cash register. The edge computing device can assign a lower confidence level value (e.g., a value below a threshold confidence level) if the payment method is identified as a card but the guest swipes or taps the card at a POS terminal and/or the cashier receives the card and processes the card without the cash register drawer opening. As yet another example, the edge computing device can assign a lower confidence level value if the payment method is identified as cash, regardless of any detected and classified movements of the cash between the guest and the cashier. As another example, the edge computing device can assign a higher confidence level value if the payment type is not identified but the edge computing device identifies movement of a payment method from the guest to the cashier, the cash register drawer opening, and the cash register drawer being closed without the cashier taking any money out of the cash register. The edge computing device can assign one or more other confidence levels depending on the identification of the payment method and/or the type of movement.

The edge computing device can determine whether the confidence level exceeds a threshold scam confidence value in block 514. The threshold scam confidence value can be any predetermined value. The threshold value can be different for each retail environment. The same threshold value can also be used for a network of retail environments (e.g., retail environments within a same geographic region, within a threshold distance from each other such as a radius). The threshold value can vary depending on one or more factors, such as a frequency of K1 scams (or scams at POS terminals and other checkout lanes more generally) in the particular retail environment or a geographic region of the retail environment, a frequency of other security and/or safety events in the retail environment or geographic region of the retail environment, size of the retail environment, busyness and/or traffic in the retail environment, etc. As an illustrative example, the more common K1 scams are in the geographic region of the retail environment, the lower the threshold confidence value. On the other hand, the less common K1 scams or other safety and/or security events in the retail environment, the higher the threshold confidence value.

In block 516, the edge computing device can return a scam indication based on the confidence level exceeding the threshold level. If the indication exceeds the confidence level, then a scam has likely (or most likely) been identified during the current checkout process. Returning the scam indication can include transmitting a notification, alert, or other message to the POS terminal, the cash register, or another device or system used by the cashier during the checkout process at the particular checkout lane. Returning the scam indication can also include transmitting a notification, alert, and/or other message to a computing device of another employee or relevant stakeholder, such as safety and security personnel, law enforcement, etc. The message can include, in some implementations, one or more portions of the image data depicting the guest during the checkout process. Therefore, the portion(s) of the image data may be used by the relevant stakeholder to objectively identify the guest engaging in the scam, approach the guest, apprehend the guest, and/or monitor the guest.

For example, the edge computing device can optionally prompt the guest for an alternative payment method (block 518). A notification can be transmitted to the POS terminal, cash register, and/or a computing device of the cashier, prompting the guest for another form of payment. The checkout process may be stopped and prevented from being completed until the guest provides a form of payment that is taken by the POS terminal and/or the cash register.

Similarly, the edge computing device can optionally generate a notification that causes the checkout process to be stopped (block 520). The notification can be transmitted to the POS terminal, cash register, and/or computing device of the cashier. The notification can, for example, instruct the cashier to cancel the transaction. The notification can instruct the cashier to call another employee for assistance in completing the checkout process. As another example, the notification can be automatically executed at the receiving device and may cause the receiving device to stop the checkout process, cancel the transaction, or otherwise freeze any activities at the receiving device. For example, the receiving device can be the POS terminal and the POS terminal may automatically lock and prevent the acceptance of any form of payment and/or prevent receiving user input to complete the checkout process and/or transaction. As another example, the receiving device can be the cash register and the cash register may automatically lock and prevent acceptance of any form of payment and/or prevent any override actions by the cashier that may otherwise be used to complete the checkout process and/or transaction.

Optionally, the edge computing device can transmit the scam indication to one or more relevant stakeholders, as mentioned above (block 522). The relevant stakeholders may include, but are not limited to, law enforcement, safety and/or security personnel, the cashier, or other employees in the retail environment. Who receives the indication may depend on the confidence level. For example, a higher confidence level (e.g., a confidence level above a threshold reporting or severity level) can indicate a higher likelihood that a scam is occurring, which may pose a greater risk to the retail environment. Therefore, the situation may be escalated and the indication can be transmitted to certain relevant stakeholders, such as law enforcement or safety and security personnel. As another example, a confidence level below a threshold reporting or severity level can indicate a lesser likelihood that a scam is occurring and therefore may not pose a substantial risk to the retail environment. Therefore, the situation may not be escalated and an indication may simply be transmitted to an in-store employee and/or the cashier to notify them of the potential scam.

Figure 6:
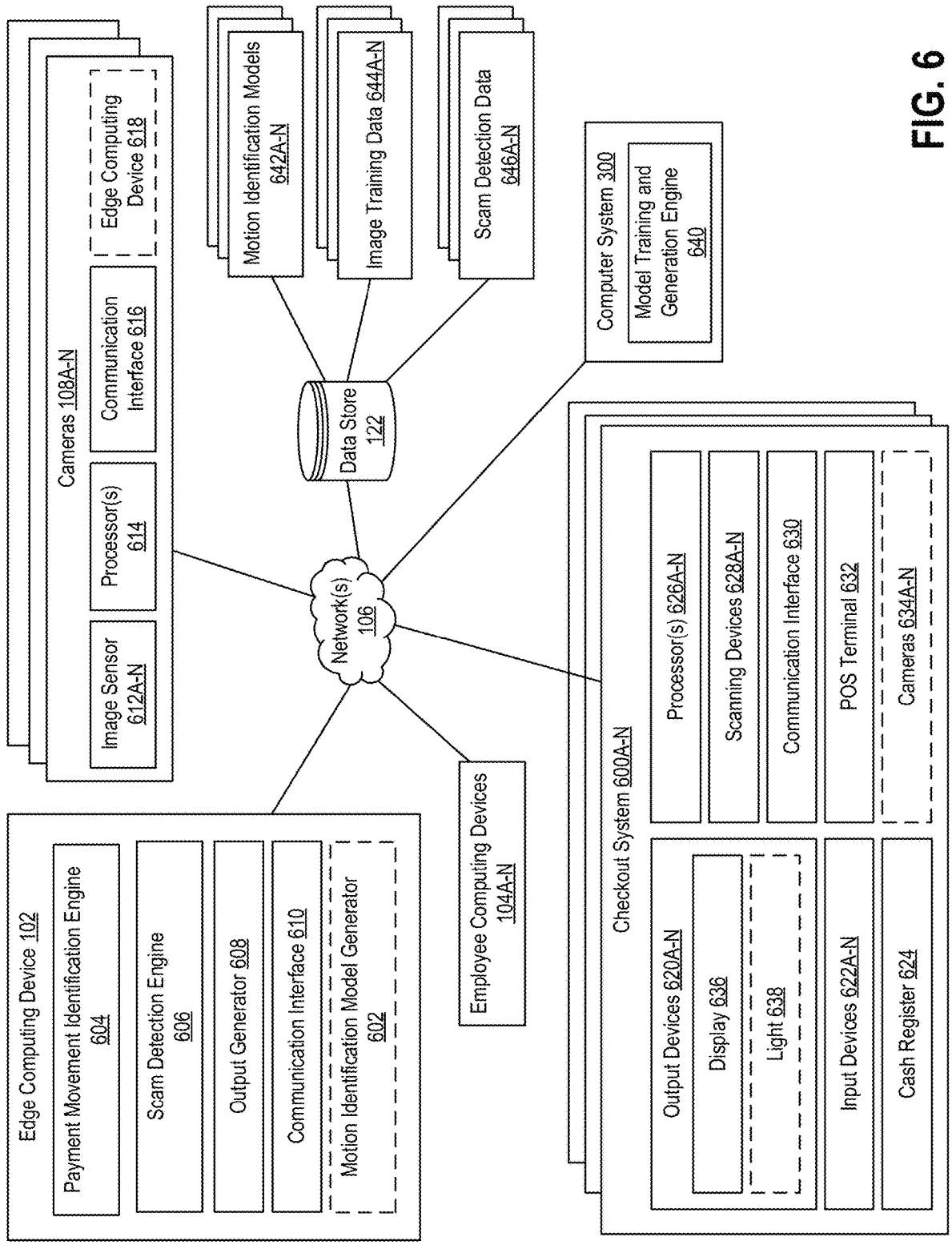
FIG. 6 is a system diagram of components that can perform the disclosed techniques.

If, in block 514 on the other hand, the confidence level does not exceed the threshold level, then block 516 and/or blocks 518-522 may not be performed. Instead, the edge computing device may stop the process 500. For example, indications, messages, alerts, and/or notifications may not be returned or stored. In some implementations, the edge computing device can return to block 502 and continue through the process 500 to determine whether any scams are detected in the image data of the checkout area in the retail environment FIG. 6 is a system diagram of components that can perform the disclosed techniques. The edge computing device 102, employee computing devices 104A-N, cameras 108A-N, data store 122, computer system 300, and/or checkout system 600A-N can be in communication (wired and/or wireless) via network(s) 106.

The edge computing device 102 can be configured to detect and identify scams on the edge during checkout processes in a retail environment. The edge computing device 102 can be part of one or more components in the retail environment, as described herein. For example, the edge computing device 102 can be firmware or software installed on a POS terminal and/or one or more checkout systems 600A-N in the retail environment. As another example, the edge computing device 102 can be firmware or software installed on one or more of the cameras 108A-N. In some implementations, one or more of the cameras 108A-N can include a physical housing having the edge computing device 102 therein. One or more other configurations of the edge computing device 102 are also possible. The edge computing device 102 can include a payment movement identification engine 604, scam detection engine 606, output generator 608, communication interface 610, and optional motion identification model generator 602.

The payment movement identification engine 604 can be configured to identify and classify movement of a form of payment in image data. The engine 604 can receive image data from one or more of the cameras 108A-N. The engine 604 may also retrieve one or more motion identification models 642A-N from the data store 122. Using the retrieved model(s), the engine 604 can identify, classify, and/or score movement in the image data. The engine 604 may also identify a type of payment that appears in the image data, such as a card or cash, using the disclosed techniques. Refer to discussion of identifying movement and type of payment in blocks 504-512 in the process 500 of FIG. 5 for further discussion.

The scam detection engine 606 can be configured to determine whether a scam, such as a K1 scam, is occurring in the retail environment, based on analysis and processing of the image data by at least the payment movement identification engine 604. The engine 606 can receive event data from one or more components of the checkout system 600A-N, which can be correlated to the detections and identifications made by the payment movement identification engine 604 to determine a likelihood and/or presence of a scam in the retail environment. As described herein, the engine 606 may also determine presence and/or likelihood of a scam based on processing only the image data from the cameras 108A-N. Refer to the processes 400, 430, 450, and 500 in the FIGS. 4A, 4B, 4C, and 5 for further discussion about determining whether a scam occurs in the retail environment. Determinations made by the engine 606 can be stored as scam detection data 646A-N in the data store 122.

The output generator 608 can be configured to generate output about scam determinations that are made by the scam detection engine 606. For example, the output generator 608 can generate notifications, alerts, and/or messages that may be transmitted to one or more components described herein (e.g., the employee computing devices 104A-N, the checkout systems 600A-N, law enforcement devices). The output generator 608 can also generate one or more instructions that, when executed, cause components of the checkout system 600A-N and/or employee computing devices 104A-N to perform one or more actions. For example, the instructions can cause the checkout system 600A-N to halt a transaction or checkout process (e.g., reject acceptance of one or more payment methods from the guest). As another example, the instructions can cause the checkout system 600A-N to prompt the guest for an alternative form of payment. As yet another example, the instructions can cause the checkout system 600A-N to cancel the current transaction. As another example, the instructions can cause a light at the checkout system 600A-N to flash or otherwise illuminate, thereby calling the attention of another in-store employee to assist the guest and cashier through the checkout process. One or more other instructions, notifications, alerts, and/or messages may also be generated by the output generator 608, stored in the data store 122 as part of the scam detection data 646A-N, and/or transmitted to one or more devices and/or systems described herein.

The communication interface 610 can provide for communication between the components described herein.

The optional motion identification model generator 602 can be configured to generate and/or train one or more of the motion identification models 642A-N or other models described throughout this disclosure. Refer to discussion of model training and generation engine 640 of the computer system 300 further below.

The employee computing devices 104A-N can be any type of user computing device, including but not limited to mobile devices, mobile phones, smart phones, laptops, tablets, computers, wearable devices, etc. Each employee in the retail environment (e.g., cashiers, safety and security personnel) can be assigned or otherwise have a computing device 104A-N. Information can be presented at the computing devices 104A-N, including one or more notifications, alerts, messages, or other indications generated using the disclosed techniques. For example, indications of scams that are generated by the output generator 608 of the edge computing device 102 can be transmitted to one or more computing devices 104A-N for presentation and display. The employees at the respective computing devices 104A-N can then provide user input at the respective devices to perform one or more actions in response to viewing the indications or other output. In some implementations, the computing devices 104A-N can retrieve the scam detection data 646A-N from the data store 122 to be further analyzed or reviewed by the respective users of the devices. Accordingly, the computing devices 104A-N may include input devices, output devices, processors, and communication interfaces similar to those components described throughout FIG. 6 (e.g., in reference to the checkout systems 600A-N).

The cameras 108A-N can be configured to capture image data of one or more areas in the retail environment. For example, at least one camera 108A-N can be positioned at, near, and/or around an exit area of the retail environment. One or more cameras 108A-N can also be positioned at, near, and/or around particular checkout lanes, a checkout area, aisles, departments, etc. in the retail environment.

The cameras 108A-N can capture continuous streams of image data, such as video feeds. The cameras 108A-N can also capture still images. The cameras 108A-N can be any type of cameras in the retail environment, such as CCTV cameras or other types of surveillance cameras. The cameras 108A-N can include pan-tilt-zoom cameras, high resolution cameras, and/or low resolution cameras. One or more of the cameras 108A-N may already be installed in the retail environment and retrofitted to perform the disclosed techniques. In some implementations, one or more of the cameras 108A-N can also be installed in the retail environment to perform the disclosed techniques. Refer to FIGS. 1-2 for further discussion about the camera layout(s), settings, and/or features in the retail environment. Each of the cameras 108A-N can include image sensors 612A-N, processor(s) 614, communication interface 616, and an optional edge computing device 618.

The image sensors 612A-N can be configured to capture image data from a FOV of each of the respective cameras 108A-N. The image sensors 612A-N can capture a stream of images and/or videos.

The processor(s) 614 can be configured to perform one or more operations described herein. For example, the processor(s) 614 can receive, from the image sensors 612A-N, the captured images and process those images. Processing the images may include performing object detection techniques to identify a form of payment in the image data. Processing the images may include identifying a movement of the form of payment in the image data. Processing the images may also include identifying a cash register drawer open event. One or more other processing techniques described herein can be performed by the processor(s) 614.

The communication interface 616 can provide communication between components of the camera 108A-N and one or more other components described herein.

The optional edge computing device 618 can be the same as the edge computing device 102. The edge computing device 618 can perform one or more of the processes and functions of the edge computing device 102 as described herein. In some implementations, the edge computing device 618 can be firmware or software installed and executed by the processor(s) 614 of the camera 108A-N. In some implementations, one of the cameras 108A-N in the retail environment can have the edge computing device 618 to perform the disclosed techniques for detecting scams in the retail environment. In some implementations, each of the cameras 108A-N in the retail environment (or a subset of the cameras 108A-N in the retail environment) can have respective edge computing devices 618 to perform the techniques described herein. One or more other variations of the edge computing device 618 are also possible.

The data store 122 can be any type of data storage system, database, and/or cloud based storage. The data store 122 can be part of one or more components described herein (e.g., the computer system 300), in some implementations. The data store 122 can be configured to store various inputs, outputs, models, information, and/or data described throughout this disclosure. Any of the information or data stored in the data store 122 may also be retrieved by one or more of the components described herein.

As an illustrative example, the data store 122 may store motion identification models 642A-N, image training data 644A-N, and/or scam detection data 646A-N. The motion identification models 642A-N can include any of the models described herein for detecting a form of payment, identifying and classifying movement of the form of payment, and/or identifying cash register open events. The image training data 644A-N can include any of the image data used by the model training and generation engine 640 and/or the motion identification model generator 602 to train the motion identification models 642A-N. Refer to the training image data 302 in FIG. 3 for further discussion. The scam detection data 646A-N can include any of the output, indications, confidence levels, or other determinations about scams that are made by the components, devices, and/or systems described herein.

Still referring to FIG. 6, the computer system 300 can be any type of computing system as described in reference to FIG. 3. The computer system 300 can be configured to train one or more of the motion identification models 642A-N and other models described throughout this disclosure. Accordingly, the computer system 300 can include a model training and generation engine 640. The model training and generation engine 640 can be configured to perform the techniques and processes described in reference to FIG. 3. As described herein, the models 642A-N can be trained using the image training data 644A-N. The image training data 644A-N can be retrieved, by the engine 640, from the data store 122. The engine 640 can also receive the image training data 644A-N directly from one or more of the cameras 108A-N. The generated models 642A-N can be stored in the data store 122. One or more of the models 642A-N can also be transmitted to and deployed directly at the edge computing device 102 and/or the optional edge computing device 618 of the cameras 108A-N. In some implementations, one or more of the models 642A-N can be stored in the data store 122 then retrieved at a later time by the edge computing device 102 and/or the optional edge computing device 618.

The checkout system 600A-N can be part of any checkout lane in the retail environment. Each manual checkout lane, for example, can include the checkout system 600A-N. In some implementations, each self-checkout lane may also include the checkout system 600A-N. The checkout system 600A-N can be comprised of more than one device and/or system that can be used during a checkout process. Accordingly, each checkout system 600A-N can include output devices 620A-N, input devices 622A-N, cash register 624, processor(s) 626A-N, scanning devices 628A-N, communication interface 630, POS terminal 632, and optional cameras 634A-N. In some implementations, one or more of the components 620A-N, 622A-N, 624, 626A-N, 628A-N, 632, and/or 634A-N can be separate from the checkout system 600A-N or otherwise considered separate devices and/or systems. As an illustrative example, the POS terminal 632 can be a separate system and/or device from the cash register 624.

Referring to the components of the checkout systems 600A-N, the output devices 620A-N can include a display 636 and/or an optional light 638. The output devices 620A-N may also include one or more other devices, including but not limited to lights, speakers, keypads, audio output/speaker, etc. The output devices 620A-N can provide some form of output for presentation. For example, the output devices 620A-N can present information about a current checkout process, such as transaction data (e.g., a bill, list of items currently added to the transaction, a total cost of the items). The output devices 620A-N can also present information about a detected scam during the current checkout process. For example, if a K1 scam is detected, a message can be presented at the display 636 that prompts the guest for another form of payment or notifies the guest that the transaction is being cancelled. As another example, if the K1 scam is detected, the optional light 638 can flash until an in-store employee approaches the corresponding checkout lane and assists the guest and/or the cashier in the checkout process.

In some implementations, the display 636 and/or the light 638 can be part of or integrated into one or more components of the checkout system 600A-N. For example, the display 636 can be part of the POS terminal 632, the cash register 624, and/or the input devices 622A-N.

The display 636 can be a touchscreen, OLED screen, or other type of display screen configured to output information about the transaction (e.g., items that have been scanned, prices for the scanned items, total cost for the transaction) and/or information about a potential scam detection, as described herein. For example, the display 636 can receive output from the output generator 608 and present the output in a graphical user interface (GUI) display. The display 636 may also be an input device, such as a touchscreen display, and can receive input from the guest.

The optional light 638 can be configured to flash or otherwise illuminate in response to one or more instructions that are received from the edge computing device 102 or another device or system described herein. For example, the light 638 can be an overhead light near the cash register 624, which can be activated (e.g., automatically, manually) when a scam is detected and/or when assistance may be required from an in-store employee (e.g., a manager, safety and security personnel). The light 638 can be any type of light signal including but not limited to an infrared light, LiDAR, red light, an LED, etc.

The input devices 622A-N can be any type of input device, including but not limited to a keyboard, keypad, touchpad, touchscreen, display screen, microphone, mouse, etc. In some implementations, one or more of the input devices 622A-N may also be the same as one or more of the output devices 620A-N. Moreover, one or more of the input devices 622A-N may be part of one or more of the components described herein, such as the display 636, the cash register 624, the scanning devices 628A-N, and/or the POS terminal 632. The input devices 622A-N can be configured to receive input from the guest (e.g., swiping a card as a form of payment), the cashier (e.g., manually entering information about one or more items to be added to the transaction, manually entering one or more forms of payment, adjusting information in the transaction such as applying a discount or coupon), and/or other users during a checkout process (e.g., a coworker approaching the checkout lane and overriding a system notification).

The cash register 624 can be any type of cash register or similar terminal/system used by a cashier during a checkout process. The cash register 624 can include one or more display screens, keyboard, buttons, and/or a cash register drawer for storing cash and coins. The cash register 624 may include the POS terminal 632, in some implementations. The cash register 624 may include any of the output devices 620A-N and/or the input devices 622A-N.

The processor(s) 626A-N can be configured to perform any of the operations described herein. In some implementations, the edge computing device 102 can be firmware or software installed and executed at the processor(s) 626A-N of the checkout system 600A-N. In some implementations, the processor(s) 626A-N can be part of any one or more of the cash register 624, the scanning devices 628A-N, the POS terminal 632, and/or the cameras 634A-N of the checkout system 600A-N. The processor(s) 626A-N may also include the edge computing device 102, in some implementations.

The scanning devices 628A-N can be configured to scan or otherwise identify barcodes, QR codes, labels, RFID tags, and/or SKUs of items to be purchased during a checkout process. The scanning devices 628A-N can include a handheld scanner that the cashier (and/or the guest) can point or direct towards a label on an item to be purchased. The scanning devices 628A-N can also include flatbed scanners. The cashier (and/or the guest) can move an item over the flatbed scanner, which can be configured to automatically identify a label on the item. The scanning devices 628A-N may include other types of scanning devices, including but not limited to barcode readers, RFID tag identifiers, heat sensors, scales, or other weight sensors that can be used to identify items to be purchased during a checkout process. The scanning devices 628A-N can also include cameras, such as flatbed cameras, cameras located on handheld scanners, and/or cameras positioned at, around, or near the checkout lane having the checkout system 600A-N.

The communication interface 630 can be configured to provide communication between one or more of the components described herein.

Still referring to the checkout system 600A-N, the POS terminal 632 can be positioned at each checkout lane in the retail environment and can present information to the guest as they are going through the checkout process. For example, the POS terminal 632 can output information such as items that have been scanned by the cashier, prices of the scanned items, options to update the transaction, etc. The POS terminal 632 can also be configured to present a final bill or transaction to the guest and receive a form of payment from the guest to complete the checkout process. Accordingly, the guest can scan a credit card or other type of card at the POS terminal 632 to complete the checkout process. In some implementations, the POS terminal 632 can be part of the cash register 624. The POS terminal 632 may optionally include one or more of the output devices 620A-N, the input devices 622A-N, and/or the scanning devices 628A-N.

The optional cameras 634A-N can be configured to capture image data of the checkout lane and a checkout process occurring at the checkout lane. Images captured by the cameras 634A-N can be used (e.g., by the processor(s) 626A-N) to identify and/or verify one or more items being checked out and added to the guest's transaction. The images captured by the cameras 634A-N may also be used (e.g., by the processor(s) 626A-N, the edge computing device 102, and/or the optional edge computing device 618) to identify a form of payment provided by the guest, movements around the cash register 624, movements of the payment, and/or detection of a scam at the checkout lane.

The cameras 634A-N can be low resolution overhead cameras that are installed in the retail environment, such as in a ceiling of the retail environment at the checkout area and/or near one or more checkout lanes. The cameras 634A-N can be part of a security system and/or already part of/installed in the retail environment. Therefore, new or additional equipment may not have to be installed in the store to perform the techniques described throughout this disclosure. The cameras 634A-N can also be installed at or otherwise part of one or more components of the checkout system 600A-N. For example, the cameras 634A-N can be part of the cash register 624, the scanning devices 628A-N, and/or the POS terminal 632. The cameras 634A-N can also be a separate system attached to a pole that is part of the checkout system 600A-N and that also includes the light 638. In some implementations, one or more of the cameras 634A-N may also include one or more of the cameras 108A-N described above.

Figure 7:
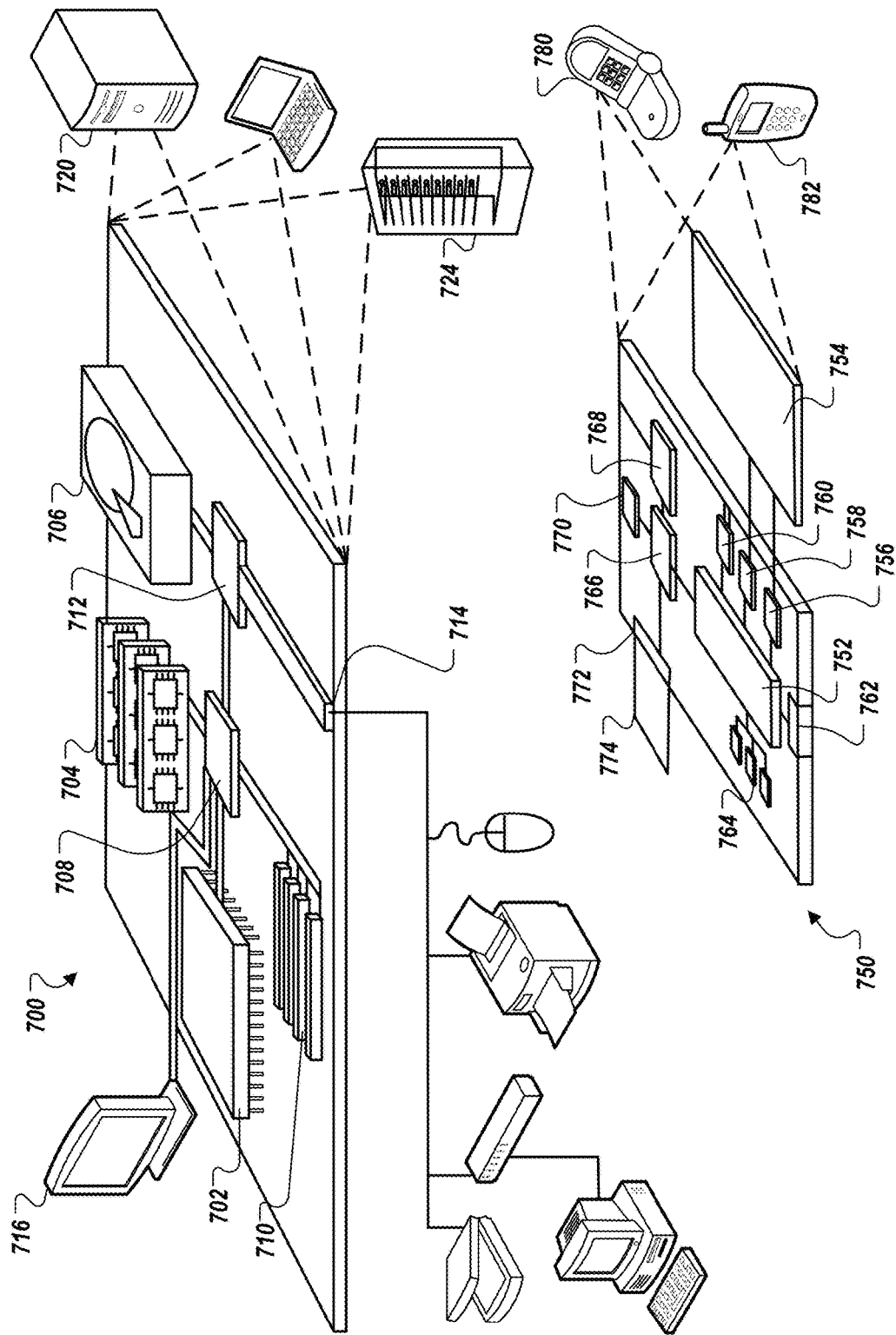
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer—or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user.

The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for detecting a scam attempt in a physical retail environment, the system comprising:
    at least one camera positioned within a physical retail environment, the at least one camera configured to capture image data of a checkout area in the physical retail environment;
    a cash register having a cash register drawer, wherein the cash register generates event data during a checkout process; and
    an edge computing device in communication with the at least one camera and the cash register, the edge computing device being configured to:
        access, from a data storage device, scam detection criteria that identifies combinations of visual features and event features that correspond to one or more checkout scams;
        receive, from the at least one camera, the image data of the checkout area;
        receive, from the cash register, the event data that is associated with the checkout process in the checkout area, wherein the event data includes a cash register drawer open event;
        detect, based on processing the image data, physical movement of a form of payment in or around the checkout area;
        correlate timestamps for the detected physical movement of the form of payment with the event data to generate correlated event data, wherein the correlating is based on the timestamps for the detected physical movement of the form of payment being within a threshold amount of time of the cash register drawer open event;
        generate a confidence value based on the correlated event data, wherein the confidence value indicates a likelihood of occurrence of the one or more checkout scams;
        determine whether the confidence value satisfies the scam detection criteria;
        generate, based on a determination that the confidence value satisfies the scam detection criteria, an indication of the one or more checkout scams; and
        return the indication of the one or more checkout scams being performed at the cash register and in the checkout area.

2. The system of claim 1, wherein the edge computing device is configured to:
    identify, based on applying a machine learning trained model to the image data, a type of payment in the image data, wherein the type is cash or a card; and
    correlate the detected physical movement with the event data to identify the one or more checkout scams based on identifying the type of payment as a card.

3. The system of claim 2, wherein the edge computing device is configured to:
    identify the type of payment in the image data as cash; and
    based on determining that the type of payment is cash, return to the receiving, from the at least one camera, the image data of the checkout area.

4. The system of claim 1, wherein the edge computing device is configured to: (i) assign a confidence value above a threshold confidence value based on the cash register drawer open event having the timestamp within the threshold amount of time after the timestamp of the detected physical movement or (ii) assign the confidence value below the threshold confidence value based on an absence of the cash register drawer open event in the event data, wherein the confidence value indicates a likelihood of occurrence of the one or more checkout scams.

5. The system of claim 1, wherein detecting the physical movement comprises:
    identifying, using object detection techniques, a portion of the image data having the cash register that generated the event data during the checkout process;
    extracting the portion of the image data; and
    detecting the movement of the form of payment in the extracted portion of the image data.

6. The system of claim 1, wherein detecting the physical movement comprises:
    identifying a direction of the detected physical movement; and
    generating a confidence value that the direction of the detected physical movement corresponds to the one or more checkout scams, wherein the direction of the detected physical movement is from a guest to a cashier in the checkout area.

7. The system of claim 1, wherein the edge computing device is configured to detect the physical movement based on applying a model to the image data, the model having been trained with machine learning techniques to (i) identify the form of payment from a background in the image data, (ii) classify the detected form of payment as cash or card, (iii) detect the physical movement of the form of payment in the image data, and (iv) classify the detected physical movement.

8. The system of claim 1, wherein the edge computing device is further configured to:
    detect the cash register drawer opening in the image data based on applying a model to the image data;
    determine whether the detecting of the cash register drawer opening has a timestamp within the threshold amount of time after the timestamp of the detected physical movement;

identify the one or more checkout scams based on the timestamp of the cash register drawer opening being within the threshold amount of time after the timestamp of the detected physical movement; and assign, based on identifying the one or more checkout scams, a confidence value to the identified one or more checkout scams, the assigned confidence value being above a threshold confidence value.

9. The system of claim 8, wherein the edge computing device is configured to increase the assigned confidence value based on determining that the event data includes at least one of (i) the indication that the checkout process is a cash transaction and (ii) the cash register drawer open event.

10. The system of claim 8, wherein the edge computing device is further configured to:

identify a type of payment in the image data, the type being cash or a card; and identify the one or more checkout scams based on (i) the timestamp of the cash register drawer opening being within the threshold amount of time after the timestamp of the detected physical movement and (ii) the identified type of payment being a card.

11. The system of claim 1, wherein:

returning the indication of the one or more checkout scams comprises transmitting the indication to a computing device of a relevant stakeholder for presentation in a graphical user interface (GUI) display at the computing device, the relevant stakeholder comprises at least one of a cashier, an in-store employee, a safety and security personnel, and law enforcement, and returning the indication comprises transmitting, to the computing device, at least one of (i) a portion of the image data depicting a guest in the checkout area during the checkout process and (ii) transaction data correlated with the checkout process.

12. The system of claim 1, wherein returning the indication of the one or more checkout scams comprises transmitting instructions to the cash register that, when executed, (i) cause the cash register to temporarily stop the checkout process or (ii) prompt a guest in the checkout area to provide an alternative form of payment during the checkout process.

13. The system of claim 1, wherein at least one of the image data and the event data is received in real-time.

14. The system of claim 1, wherein at least one of the image data and the event data is received in near real-time.

15. The system of claim 1, wherein the at least one camera includes a physical housing and the edge computing device is positioned in the physical housing.

16. The system of claim 1, wherein the edge computing device is firmware or software installed on the at least one camera.

17. A method for detecting a scam attempt in a physical retail environment, the method comprising:

accessing, by a computing device and from a data storage device, scam detection criteria that identifies combinations of visual features and event features that correspond to one or more checkout scams;

receiving, by the computing device and from at least one camera, image data of a checkout area in a physical retail environment;

receiving, by the computing device and from a cash register, event data that includes a cash register drawer open event;

detecting, by the computing device and based on processing the image data, physical movement of a form of payment in or around the checkout area;

correlating, by the computing device, timestamps for the detected physical movement of the form of payment with the event data to generate correlated event data, wherein the correlating is based on the timestamps for the detected physical movement of the form of payment being within a threshold amount of time of the cash register drawer open event;

generating, by the computing device, a confidence value based on the correlated event data wherein the confidence value indicates a likelihood of occurrence of the one or more checkout scams;

determining, by the computing device, whether the confidence value satisfies the scam detection criteria;

generating, by the computing device, based on a determination that the confidence value satisfies the scam detection criteria, an indication of the one or more checkout scams; and returning, by the computing device, the indication of the one or more checkout scams being performed at the cash register and in the checkout area.

18. The method of claim 17, wherein the at least one camera is positioned within the physical retail environment, the at least one camera configured to capture the image data of the checkout area in the physical retail environment.

19. The method of claim 17, wherein the event data is generated by the cash register during the checkout process, wherein the event data is associated with the checkout process in the checkout area.

20. The method of claim 17, wherein the cash register has a cash register drawer.

* * * * *